United States Patent
Schwartz et al.

(10) Patent No.: US 12,388,837 B2
(45) Date of Patent: *Aug. 12, 2025

(54) SYSTEM AND METHOD OF INTELLIGENT DETECTION OF DATA MODEL FIELDNAME LINEAGE WITH GEOGRAPHICAL LOCATION MOVEMENT CONTROL

(71) Applicant: BOOMI, LP, Chesterbrook, PA (US)

(72) Inventors: Daniel Schwartz, Marlton, NJ (US); Michael J. Morton, Morrisville, NC (US); Rohan Jain, King of Prussia, PA (US)

(73) Assignee: BOOMI, LP, Chesterbrook, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/844,571

(22) Filed: Jun. 20, 2022

(65) Prior Publication Data

US 2022/0321573 A1 Oct. 6, 2022

Related U.S. Application Data

(63) Continuation of application No. 16/735,345, filed on Jan. 6, 2020, now Pat. No. 11,368,467.

(51) Int. Cl.
*H04L 9/40* (2022.01)
*G06F 16/25* (2019.01)
*G06F 21/62* (2013.01)

(52) U.S. Cl.
CPC .......... *H04L 63/107* (2013.01); *G06F 16/252* (2019.01); *G06F 21/62* (2013.01)

(58) Field of Classification Search
CPC ..... H04L 63/10–108; G06F 21/60–645; G06F 16/252
See application file for complete search history.

(56) References Cited

U.S. PATENT DOCUMENTS

| | | | |
|---|---|---|---|
| 6,334,158 B1 | 12/2001 | Jennyc | |
| 7,548,542 B2 * | 6/2009 | Lepel | G06F 16/25 707/999.102 |

(Continued)

FOREIGN PATENT DOCUMENTS

EP 3739890 A1 11/2020

OTHER PUBLICATIONS

Brazhnik, Olga, and John F. Jones. "Anatomy of data integration." Journal of biomedical informatics 40.3 (2007): 252-269. (Year: 2007).*

(Continued)

*Primary Examiner* — Madhuri R Herzog
(74) *Attorney, Agent, or Firm* — Prol Intellectual Property Law, PLLC; H. Kenneth Prol

(57) ABSTRACT

An information handling system operating a data integration protection assistance system may comprise a processor linking first and second data set field names identified within a previous execution of a data integration process for transferring a data set field value identified by the first data field name at a source geographic location to a destination geographic location for storage under the second data field name. The processor may receive a user instruction to associate data set field names labeled as sensitive private individual data with a barred geographic location, determine the second data set field name is labeled as sensitive private individual data and the destination storage location matches the barred geographic location. A graphical user interface may display a notice that the data set field value was stored during the previously executed integration process within the barred geographic location.

14 Claims, 9 Drawing Sheets

(56) References Cited

U.S. PATENT DOCUMENTS

| | | | | |
|---|---|---|---|---|
| 8,898,105 | B1* | 11/2014 | Peddy | G06F 16/487 |
| | | | | 707/602 |
| 9,268,789 | B1* | 2/2016 | Swerdlow | G06F 16/1827 |
| 2007/0050420 | A1 | 3/2007 | Sankruthi | |
| 2009/0320052 | A1* | 12/2009 | Crucs | G06F 40/186 |
| | | | | 719/329 |
| 2014/0171075 | A1 | 6/2014 | Teller | |
| 2017/0126698 | A1 | 5/2017 | Minkovich | |
| 2018/0241569 | A1* | 8/2018 | Harmon | H04L 67/52 |
| 2020/0184092 | A1 | 6/2020 | Meng | |
| 2020/0366683 | A1* | 11/2020 | Sugawara | H04L 67/52 |
| 2021/0192011 | A1* | 6/2021 | Kasahara | G06F 21/6245 |

OTHER PUBLICATIONS

Dove, Edward S., et al. "Genomic cloud computing: legal and ethical points to consider." European Journal of Human Genetics 23.10 (2015): 1271-1278. (Year: 2015).*

L. Hippelainen, et al., "Survey of cloud server geolocating techniques," 2016 19th Conference of Open Innovations Association (FRUCT), 2016, pp. 54-65, doi: 10.23919/FRUCT.2016.7892183. (Year: 2016).

D. Peras, et al., "Influence of GDPR on social networks used by omnichannel contact center," MIPRO, May 21-25, 2018, pp. 1132-1137.

F.Y. Akeel, et al., "Exposing Data Leakage in Data Integration Systems", 9th International Conference for Internet Technology and Secured Transactions (ICITST—2014), Dec. 8-10, 2014, pp. 420-425.

* cited by examiner

FIG. 5

Dashboard ▼  Build  Deploy  Manage ▼ — 524

Select a Process — 516
Attach Contact to Vendor

| Category | Data model fieldname | Shape | Operation Name | Type | Country | Process |
|---|---|---|---|---|---|---|
| National | Social_Security_Number | Start | Application A Vendor Lookup | Application A | Chile, United States | Attach Contact to Vendor |
| National | Title | Connector | Application B Vendor Store | Application B | Chile, United States | Attach Contact to Vendor |
| Personal | Vendor/ nullFieldList/ name | Connector | Application A Vendor Lookup | Application A | Chile, United States | Attach Contact to Vendor |
| Security | Vendor/ subscriptionsList/ lastModifiedDate | Connector | Application A Vendor Lookup | Application A | Chile, United States | Attach Contact to Vendor |
| Sensitive | | Connector | Application A Vendor Lookup | Application A | Chile, United States | Attach Contact to Vendor |
| Health | | Connector | Application A Vendor Lookup | Application A | Chile, United States | Attach Contact to Vendor |
| Financial | Vendor/ taxIDNumber | Connector | Application A Vendor Lookup | Application A | Chile, United States | Attach Contact to Vendor |

SEARCH — 518, 520, 522

SYSTEM AND METHOD OF INTELLIGENT DETECTION OF DATA MODEL FIELDNAME LINEAGE WITH GEOGRAPHICAL LOCATION MOVEMENT CONTROL

This application is a continuation of prior application Ser. No. 16/735,345, entitled "SYSTEM AND METHOD OF INTELLIGENT DETECTION OF DATA MODEL FIELDNAME LINEAGE WITH GEOGRAPHICAL LOCATION MOVEMENT CONTROL," filed on Jan. 6, 2020, which claims priority to U.S. Provisional Application No. 62/909,162, entitled "SYSTEM AND METHOD OF INTELLIGENT DETECTION OF DATA MODEL FIELDNAME LINEAGE WITH GEOGRAPHICAL LOCATION MOVEMENT CONTROL," filed on Oct. 1, 2019, which is assigned to the current assignee hereof and incorporated by reference in its entirety.

FIELD OF THE DISCLOSURE

The present disclosure relates generally to a system and method for deploying and executing customized data integration processes. More specifically, the present disclosure relates to geographical tracking of data model field values likely to include sensitive personal information as they are manipulated during a customized data integration process

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which:

FIG. 5 is a graphical user interface for describing data model field values labeled as sensitive information according to an embodiment of the present disclosure;

The use of the same reference symbols in different drawings may indicate similar or identical items.

DETAILED DESCRIPTION

Figure 1:
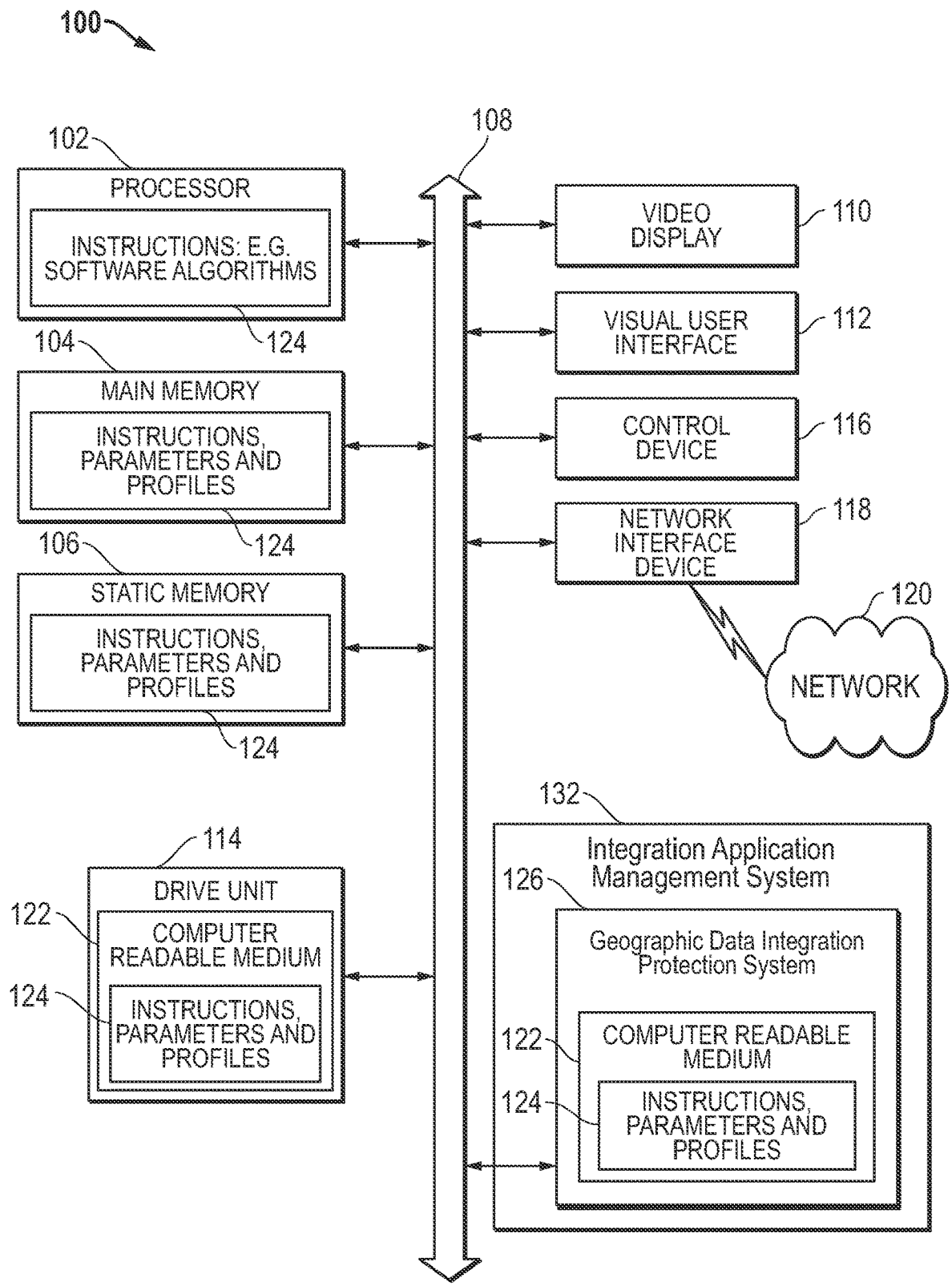
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution of a computer-readable medium, or distribution via download of the application from the worldwide web to an end user. Upon receipt of the downloaded application, the end user executes installation files to install the executable software application on the user's personal computer (PC), or other information handling system. When the software is initially executed, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might sometimes be satisfactory for individual end users, it is undesirable in sophisticated computing environments.

Today, most corporations or other enterprises have sophisticated computing systems that are used both for internal operations, and for communicating outside the enterprise's network. Much of present day information exchange is conducted electronically, via communications networks, both internally to the enterprise, and among enterprises. Accordingly, it is often desirable or necessary to exchange information/data between distinctly different computing systems, computer networks, software applications, etc. In many instances, these disparate computing networks, enterprises, or systems are located in a variety of different countries around the world. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's purchase order processing system. There is also a significant need to communicate between different software applications/systems within different computing networks, e.g. between a buyer's purchase order processing system, and a seller's invoicing system. Some of these different software applications/systems may be cloud-based, with physical servers located in several different countries, cities, or other geographical locations around the world. As data is integrated between and among these cloud-based platforms, data model field values may be stored (e.g., temporarily or indefinitely) in some form at physical servers in these various geographical locations.

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are available in the market today. These applications are typically purchased from software vendors and installed on a computerized system owned and maintained by the business, in this example, the buyer. The seller will have a similar/complementary software application on its system, so that the information exchange may be completely automated in both directions. In contrast to the present disclosure, these applications are purchased, installed and operated on the user's local system. Thus, the user typically owns and maintains its own copy of the system, and configures the application locally to connect with its trading partners.

In both the traditional and more recent approaches, the executable software application is universal or "generic" as to all trading partners before it is received and installed within a specific enterprise's computing network. In other words, it is delivered to different users/systems in identical, generic form. The software application is then installed within a specific enterprise's computing network (which may include data centers, etc., physically located outside of an enterprises' physical boundaries). After the generic application is installed, it is then configured and customized for a specific trading partner after which it is ready for execution to exchange data between the specific trading partner and the enterprise. For example, Walmart® may provide on its website specifications of how electronic data such as Purchase Orders and Invoices must be formatted for electronic data communication with Walmart, and how that data should be communicated with Walmart®. A supplier/enterprise is then responsible for finding a generic, commercially available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

Recently, systems and software applications have been established to provide a system and method for on-demand creation of customized software applications in which the customization occurs outside of an enterprise's computing network. These software applications are customized for a specific enterprise before they arrive within the enterprise's computing network, and are delivered to the destination network in customized form. The Dell Boomi® Application is an example of one such software application. With Dell Boomi® and other similar applications, an employee within an enterprise can connect to a website using a specially configured graphical user interface to visually model a business integration process via a flowcharting process, using only a web browser interface. During such a modeling process, the user would select from a predetermined set of process-representing visual elements that are stored on a remote server, such as the web server. By way of an example, the integration process could enable a bi-directional exchange of data between internal applications of an enterprise, between internal enterprise applications and external trading partners, or between internal enterprise applications and applications running external to the enterprise.

A customized data integration software application creation system in an embodiment may allow a user to create a customized data integration software application by modeling a data integration process flow using a visual user interface. A modeled data integration process flow in embodiments of the present disclosure may model actions taken on data elements pursuant to executable code instructions without displaying the code instructions themselves. In such a way, the visual user interface may allow a user to understand the high-level summary of what executable code instructions achieve, without having to read or understand the code instructions themselves. Similarly, by allowing a user to insert visual elements representing portions of an integration process into the modeled data integration process flow displayed on the visual user interface, embodiments of the present disclosure allow a user to identify what she wants executable code instructions to achieve without having to write such executable code instructions.

Once a user has chosen what she wants an executable code instruction to achieve in embodiments herein, the code instructions capable of achieving such a task may be generated by an integration application management system. Code instructions for achieving a task can be written in any number of languages and/or adhere to any number of standards, often requiring a code writer to have extensive knowledge of computer science and languages. The advent of open-standard formats for writing code instructions that are both human-readable and machine executable have made the writing of code instructions accessible to individuals that do not have a high level knowledge of computer science. Such open-standard, human-readable, machine-executable file formats include extensible markup language (XML) and JavaScript Object Notification (JSON). Because code instructions adhering to these open-standard formats are more easily understood by non-specialists, many companies have moved to the use of code instructions adhering to these formats in constructing their data repository structures and controlling the ways in which data in these repositories may be accessed by both internal and external agents. In order to execute code instructions for accessing data at such a repository during a business integration process, the code instructions of the business integration process in some embodiments herein may be written in accordance with the same open-standard formats or other known, or later-developed standard formats.

In addition to the advent of open-standard, human-readable, machine-executable code instructions, the advent of application programming interfaces (APIs) designed using such open-standard code instructions have also streamlined the methods of communication between various software components. An API may operate to communicate with a backend application to identify an action to be taken on a dataset that the backend application manages, or which is being transmitted for management to the backend application. Such an action and convention for identifying the dataset or its location may vary among APIs and their backend applications. For example, datasets may be modeled according to user-supplied definitions. Each dataset may contain a user-defined data model fieldname, which may describe a type of information. Each user-defined data model fieldname may be associated with a data model field value. In other words, datasets may be modeled using a fieldname:value pairing. For example, a data model for a customer named John Smith may include a first data model fieldname "f_name" paired with a first data model field value "John," and a second data model fieldname "l_name" paired with a second data model field value "Smith." A user in an embodiment may define any number of such data model fieldname/value pairs to describe a user. Other example data model fieldnames in embodiments may include "dob" to describe date of birth, "ssn" to describe social security number, "phone" to describe a phone number, or "hair," "race," and "reward."

In embodiments described herein, multiple APIs or backend applications accessed via a single integration process may operate according to differing coding languages, data model structures, data model field naming conventions or standards. Different coding languages may use different ways of describing routines, data structures, object classes, variables, or remote calls that may be invoked and/or handled during business integration processes that involve data model field values managed by the backend applications such APIs serve. Thus, a single data model field value may be described in a single integration process using a plurality of data model fieldnames, each adhering to the naming conventions set by the APIs, applications, enterprises, or trading partners through or among which the data model field value is programmed to integrate.

A user interacting with such an API for a backend application may identify such data model field values based on a description that may or may not include the actual data model fieldname of the data model field value. In some circumstances, a data model field value may be identified through a search mechanism, or through navigation through a variety of menus, for example. The code sets incorporating the actual data model fieldname for the data model field value may be automatically generating based on this user interaction with an API. In other embodiments, the data model field value may be identified in a similar way through interaction with the visual integration process flow user interface described herein. For example, the user may create two or more connector visual elements, with each connector element representing a process taken by a different application (e.g., Salesforce™, or NetSuite™). Because each of such connector elements may describe actions taken by a different application, and different applications may adhere to differing code languages, each of a plurality of code sets generated based on these user-generated connector visual elements may be written in a different code set, and may identify data model field values using different naming conventions, or storage structures. Thus, the code instructions for retrieving a given data model field value from a first application may describe that data model field value using a completely different data model fieldname than the code instructions for transmitting the same data model field value to a second application.

In embodiments described herein, a runtime engine may be created for execution of each of these code instructions written based on the user-modeled business integration process. The runtime engine, and all associated code instructions or code sets may be transmitted to an end user for execution at the user's computing device, or enterprise system, and potentially, behind the user's firewall. Because the user does not write the code instructions executed by the runtime engine, the user may not know the locations of servers through which the data to be integrated may pass during execution of the runtime engine, or the ways in which data model field values may be transformed (e.g., given a different data model fieldname) therein. As described above, the data model field values integrated during execution may pass through any number of servers, which may be located in various locations around the world. Further, the contents of these data model field values may include sensitive information (e.g., personal, secure information), which may not be readily apparent based on the metadata associated with the data model field values, or the data model fieldnames given to the data model field values by various applications involved in the integration process. A method is needed to identify, label, and track the ways in which such sensitive information is handled throughout execution of the integration process modeled by the user.

Security of personal information has become an increasing concern of governments and regulatory bodies throughout the world during the 21$^{st}$ century. As an example, the European Union (EU) has recently enacted the General Data Protection Regulation (GDPR), which dictates requirements for processing of personal data of EU individuals, regardless of the geographical location of such processing. In short, enterprises doing business within the EU may be required to adhere to the GDPR, or face stiff fines or penalties. The GDPR contains several provisions requiring controllers of personal data (e.g., enterprises engaged in data integration processes) to place an appropriate technical and organization measures to implement data protection principles. Further, upon request of an EU citizen whose personal data has been included within an integration process, an adherent to the GDPR (e.g., entity performing data integration processes) must provide adequate explanation of the ways in which such personal data has been manipulated or transferred.

One way for an enterprise system executing data integration processes to protect against infringement involves tracking the content of data model field values being integrated, and the ways in which such data is being manipulated. For example, an ability to identify sensitive information and apply added security measures to integration processes involving such sensitive information may lessen the risk of infringement. In embodiments described herein, code instructions may be searched for one or more integration processes to identify data model field values accessed, copied, transferred, or otherwise manipulated therein that may contain sensitive information. Upon identification of a data model field value meeting preset search terms designed to identify sensitive information, the identified data model field value may be labeled as sensitive using one or more of a plurality of labels. For example, sensitive information in some embodiments may receive a label identifying a data model field value as falling within one of a plurality of types of sensitive information, including personal data, sensitive data, security data, health data, financial data, or national data. Individual data model field values may be labeled as one of these categories based on a description stored in metadata (e.g., documents marked confidential), or within the data model fieldname for the data (e.g., data model field value having a data model fieldname that includes search terms such as "FirstName," or "SSN" for Social Security Number). Thus, searching code instructions including data model fieldnames and metadata of data model field values accessed, copied, transferred, or otherwise manipulated throughout an integration process may assist enterprises in determining where added security measures may be needed.

Similar methods may also assist in deterring or lessening potential fines if an infringement should occur. Failure to comply with the GDPR may result in hefty fines. The level of fine levied against a non-compliant entity is determined according to a variety of factors, that include the extent of the infringement (e.g., number of people affected and damage caused thereto), mitigating acts taken by the non-compliant entity following infringement, preventative measures taken by the non-compliant entity prior to the infringement, what types of data were impacted by the infringement, and whether the non-compliant entity promptly notified those who were affected by the infringement, among others. In the unfortunate event of an infringement, enterprises executing data integration processes may at least decrease the amount of the resultant penalties by providing detailed metrics describing data affected by each integration process, individuals whose information was incorporated within such data, and the ways in which such data was accessed, copied, transferred, or otherwise manipulated in an infringing integration process. Such detailed information may indicate preventative and mitigating measures were taken, and may assist in notification of individuals impacted. Further, providing a tangible number of individuals impacted may avoid an assumption of a much higher number of victims and damages caused thereto.

In addition to labeling a data model field value as falling within one of the preset sensitive categories described above, the geographic data integration protection system in embodiments described herein may also track the movement of such a data model field value throughout the integration process, to assist with the type or reporting required by the GDPR. As described herein, because multiple steps within the integration process may be executed using different coding languages, the code instructions for retrieving a given data model field value from a first application/location/enterprise may describe that data model field value using a completely different data model fieldname than the code instructions for transmitting the same data model field value to a second application/location/enterprise. In embodiments described herein, each data model fieldname given to a given data model field value throughout an integration process may be mapped, identifying which of these data model fieldnames was applied at each application/location/enterprise involved in the integration process, and the manipulation or action performed by each of these applications/locations/enterprises during the integration process.

Users of the visual user interface describing the flow of the integration process in embodiments described herein may use map elements to associate a first data model fieldname for a data model field value being retrieved from a first application or source with a second data model fieldname under which that data model field value will be stored at a second application or destination. Because a single integration process may transmit data model field values between or among several sources and destinations, a process flow may include several of these mapping elements, sometimes placed in series with one another. This may result in a single data model field value receiving several different data model fieldnames as it moves through a potentially large number of physical locations throughout the integration process. In embodiments described herein, information supplied via these mapping elements may be used to generate and display a fieldname lineage map that illustrates, in chronological order with respect to the integration process, the ways in which the data model fieldname used to describe a single data model field value changes throughout that process, and the locations at which such changes occur.

As described herein, security of personal information has become an increasing concern during the 21$^{st}$ century, resulting in governmental regulations such as the GDPR, requiring controllers of personal data to implement appropriate data protection principles, and provide adequate explanation of the ways in which such personal data has been manipulated or transferred. Thus, there is a need for enterprises executing an integration process to track the physical locations where data is stored or transferred throughout such an integration process, and to report the ways in which such data was manipulated at each of these steps. Further, in some circumstances, a system is needed to inhibit transfer of data to physical locations the user has identified as barred, or off-limits. For example, an enterprise may wish to avoid the transfer of data including intellectual property to countries in which patents on such subject matter have yet to be filed. As another example, enterprises may view security of servers in certain geographical location to be questionable (e.g., in countries in which data protection regulations are not applied or enforced). In such scenarios, a method of notifying the user of a potential risk, or automatically inhibiting movement of certain data through these barred geographic locations is needed.

The geographic data integration protection system in embodiments described herein addresses these issues by tracing the physical locations through which data moves during a first execution of an integration process, reporting the movement of potentially sensitive data during such a process, and in some cases, automatically adjusting the integration process to avoid transfer of sensitive data through barred locations. In embodiments described herein, a user within an enterprise system or network may execute an integration process to transfer a data model field value between a source application or location and a destination application or location. As the data model field value travels between the source and destination, metadata identifying the servers (e.g., by URL, hostname, IP address, ports, databases, etc.) may be appended to the data model field value. The geographic data integration protection system in embodiments described herein may analyze such metadata using a geolocation service to identify the geographic location of each identified server through which the data model field value travelled as it moved from the source to the destination. Further, the geographic data integration protection system may update the fieldname lineage map to associate each manipulation of the data model field value made throughout the integration process with the identified geographic location at which each manipulation occurred. In such a way, the geographic data integration protection system in embodiments may provide a lineage of each physical location at which a given data model field value is stored, transmitted, copied, or otherwise manipulated during an integration process.

In embodiments described herein, the geographic data integration protection system may further display such information, in a searchable format, for easy generation of reports complying with GDPR requirements. For example, the geographic data integration protection system in embodiments may employ a visual user interface to display descriptive information for one or more data model field values labeled as "sensitive." Such a visual display may allow a user to view all data model field values labeled under any of the sensitive categories described herein occurring within a single integration process, or across a plurality of integration processes. Users may also display descriptive information of sensitive data model field values by specific data model fieldname of the data model field value, the specific label applied to the data model field value (e.g., personal, financial, health, security, national, sensitive), or the physical location of the servers that received or temporarily stored such data model field values during the integration process. The geographic data integration protection system may also allow users to display descriptive information about such data model field values according to the shape of the visual connector associated with the code set in which the data model field value was identified as sensitive, the name of the application or enterprise executing that code set, or the way in which such a code set operated to manipulate that data model field value. Once the user locates a data model field value of interest using such a visual user interface in embodiments described herein, the geographic data integration protection system may export the code instructions in which the data model field value was identified, in one of a plurality of different code languages, as selected by the user, via the visual user interface. In such a way, the geographic data integration protection system in embodiments described herein may track which data model field values containing personal information were accessed, transferred, or otherwise manipulated during an integration process and how, as well as the applications/locations/enterprises at which such access or manipulation occurred.

As described herein, in some circumstances, a system is needed to inhibit transfer of data to physical locations the user has identified as barred, or off-limits. The geographic data integration protection system in embodiments described herein may address this issue by alerting the user to a potential risk prior to subsequent executions of an integration process, or by inhibiting such an execution, either partially or wholly. For example, in some embodiments described herein, the geographic data integration protection system may determine that a data model field value has passed through a server in a user-defined barred geographic location during a previous execution of an integration process. In such a scenario, the geographic data integration protection system in some embodiments may disable automatic or scheduled future executions of that integration process, as a whole. In other embodiments, the geographic data integration protection system may update or edit the flow diagram for the integration process to terminate only the portion of the integration process that allows for passage of the sensitive data model field value through the barred location. In such embodiments, the geographic data integration protection system may then transmit the updated integration process for execution at the enterprise system, according to an automated execution scheduler (e.g., Cron job. In such a way, the geographic data integration protection system may automatically inhibit transfer of sensitive data model field values through geographic locations barred by a user.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the geographic data integration protection system 126, or the integration application management system 132 that may operate on servers or systems, remote data centers, or on-box in individual client information handling systems such as a local display device, or a remote display device, according to various embodiments herein. In some embodiments, it is understood any or all portions of code 124 for the geographic data integration protection system 126 or the integration application management system 132 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the geographic data integration protection system 126, or the integration application management system 132 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the geographic data integration protection system 126, or the integration application management system 132. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, fingerprint scanner, retinal scanner, face recognition device, voice recognition device, or gesture or touch screen input.

The information handling system 100 may further include a visual user interface 112. The visual user interface 112 in an embodiment may provide a visual designer environment permitting a user to define process flows between applications/systems, such as between trading partner and enterprise systems, and to model a customized business integration process. The visual user interface 112 in an embodiment may provide a menu of pre-defined user-selectable visual elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular data set to be sent or received, for example, a Purchase Order. The providing of this input by the user results in the system's receipt of such user-provided information as an integration process data profile code set.

In some embodiments, the graphical user interface 112 may also allow a user to provide one or more search terms that may be used to identify data model field values affected by one or more integration processes that are likely to include sensitive information. A user in such an embodiment may interact with such a user interface 112 to include or exclude terms used by the geographic data integration protection system 124 to search code instructions executed during one or more integration processes for potentially sensitive data model field values manipulated therein. In yet another embodiment, a user may employ the graphical user interface 112 to search and view information describing data model field values identified in such a manner as potentially sensitive.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), or an API adhering to a known open source specification may enable application programs 124 to interact or integrate operations with one another.

In an example of the present disclosure, instructions 124 may execute software for identifying, labeling, tracking, and reporting information describing data model field values accessed, transferred, copied, or otherwise manipulated during an integration process, for compliance with governmental regulations. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, the integration application management system 132, and the geographic data integration protection system 126 may include a computer-readable medium 122 such as a magnetic disk, or a solid-state disk in an example embodiment. The computer-readable medium of the memory, storage devices and the geographic data integration protection system 104, 106, 114, 132 and 126 may store one or more sets of instructions 124, such as software code corresponding to the present disclosure.

The disk drive unit 114, static memory 106, and computer readable medium 122 of the geographic data integration protection system 126, or the integration application management system 132 also contain space for data storage such as an information handling system for managing locations of executions of customized integration processes in endpoint storage locations. Connector code sets, and trading partner code sets may also be stored in part in the disk drive unit 114, static memory 106, or computer readable medium 122 of the geographic data integration protection system 126, or the integration application management system 132 in an embodiment. In other embodiments, data profile code sets, and run-time engines may also be stored in part or in full in the disk drive unit 114, static memory 106, or computer readable medium 122 of the geographic data integration protection system 126, or the integration application management system 132. Further, the instructions 124 of the geographic data integration protection system 126, or the integration application management system 132 may embody one or more of the methods or logic as described herein.

In a particular embodiment, the instructions, parameters, and profiles 124, and the geographic data integration protection system 126, or the integration application management system 132 may reside completely, or at least partially, within the main memory 104, the static memory 106, disk drive 114, and/or within the processor 102 during execution by the information handling system 100. Software applications may be stored in static memory 106, disk drive 114, and the geographic data integration protection system 126, or the integration application management system 132.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof.

The geographic data integration protection system 126 and the integration application management system 132 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the geographic data integration protection system 126, and the integration application management system 132. The geographic data integration protection system 126, and the integration application management system 132 may be operably connected to the bus 108. The geographic data integration protection system 126 and the integration application management system 132 are discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the geographic data integration protection system 126, and the integration application management system 132 above and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
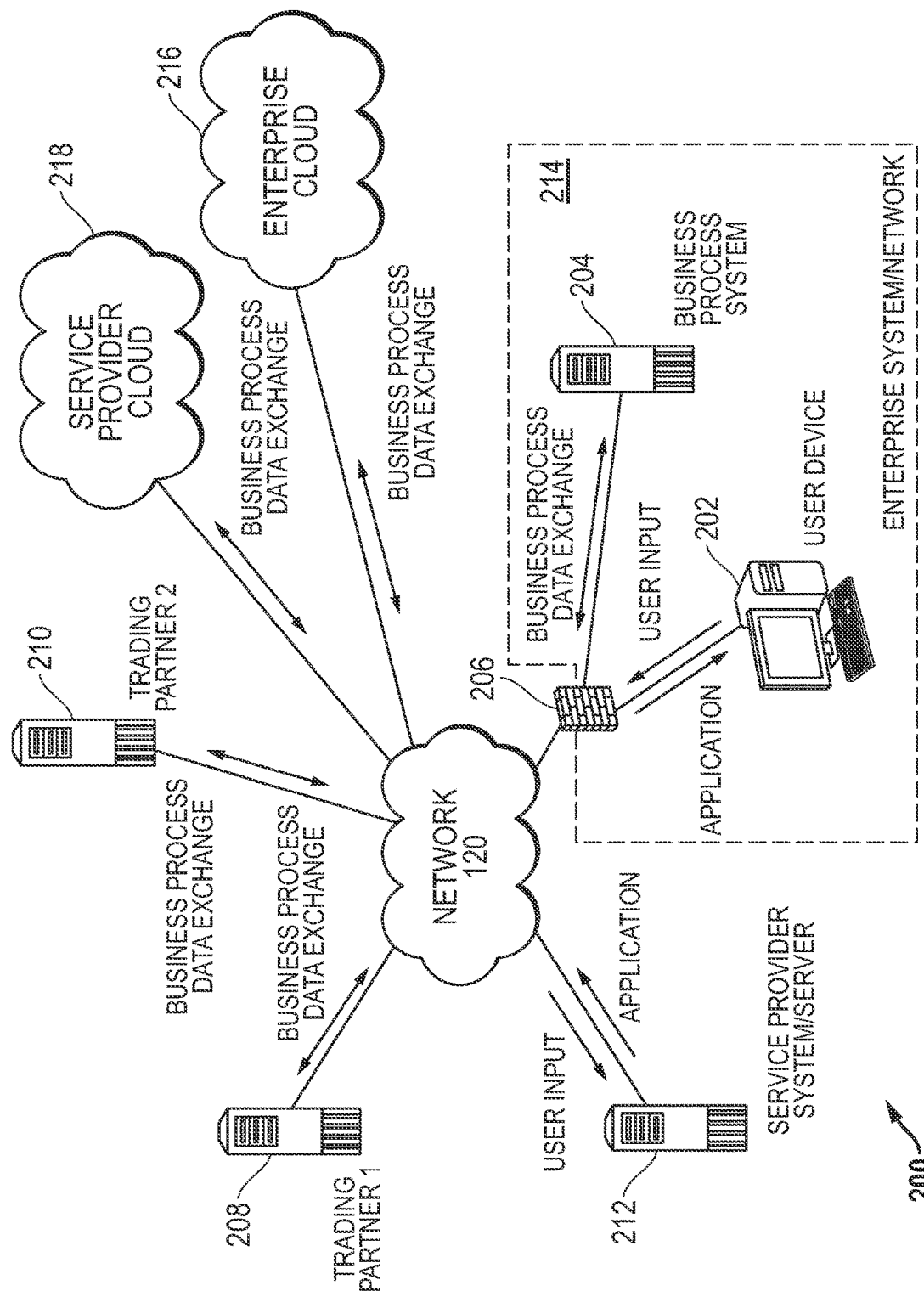
FIG. 2 is a block diagram illustrating a simplified integration network according to an embodiment of the present disclosure.

FIG. 2 is a graphical diagram illustrating a simplified integration network 200 including a service provider system/server 212 and an enterprise system/network 214 in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop or laptop PC, enabling a user to communicate via the network 120, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 120. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks, SalesForce's™ Customer Relationship Management (CRM) Platform, Oracle's™ Netsuite Enterprise Resource Planning (ERP) Platform, Infor's™ Warehouse Management Software (WMS) Application, or many other types of databases.

In an embodiment, the integration network 200 may further include trading partners 208 and 210 operating conventional hardware and software for receiving and/or transmitting data relating to business-to-business transactions. For example, Walmart® may operate trading partner system 208 to allow for issuance of purchase orders to suppliers, such as the enterprise 214, and to receive invoices from suppliers, such as the enterprise 214, in electronic data form as part of electronic data exchange processes. Electronic data exchange process in an embodiment may include data exchange via the world wide web. In other embodiments, electronic data exchange processes may include data exchange via FTP or SFTP.

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214. The service provider system/server 212 in an embodiment may host an integration process-modeling user interface in an embodiment. Such an integration process-modeling user interface may allow a user of the integration application management system to model an integration process including one or more sub-processes for data integration through a business process data exchange between an enterprise system/network 214 and outside entities or between multiple applications operating at the business process system 204. The integration process modeled in the integration process-modeling user interface in an embodiment may be a single business process data exchange shown in FIG. 2, or may include several business process data exchanges shown in FIG. 2. For example, the enterprise system/network 214 may be involved in a business process data exchange via network 120 with a trading partner 1, and/or a trading partner 2. In other example embodiments, the enterprise system/network 214 may be involved in a business process data exchange via network 120 with a service provider located in the cloud 218, and/or an enterprise cloud location 216. For example, one or more applications between which a data model field value may be transferred, according to embodiments described herein, may be located remotely from the enterprise system 214, at a service provider cloud location 218, or an enterprise cloud location 216. In some embodiments, a single data integration process may involve movement of data model field values among several different entities, in series. For example, a data model field value may travel via network 120 from the enterprise system 214, to enterprise cloud 216, then cloud service provider 218, and ultimately to trading partner 208. A data model field value may move, undergoing temporary or permanent storage or other manipulations, through potentially hundreds of such different physical servers, at potentially hundreds of geographic locations within a single integration process in some embodiments.

The geographic data integration protection system, or a user of an integration process-modeling user interface in an embodiment may model one or more business process data exchanges via network 120 within an integration process by adding one or more connector integration elements or code sets to an integration process flow. These connector integration elements in an embodiment may model the ways in which a user wishes data to be accessed, moved, and/or manipulated during the one or more business process data exchanges. Each connector element the geographic data integration protection system or the user adds to the integration process flow diagram in an embodiment may be associated with a pre-defined subset of code instructions stored at the service provider systems/server 212 in an embodiment. Upon the user modeling the integration process, the service provide system/server 212 in an embodiment may generate a run-time engine capable of executing the pre-defined subsets of code instructions represented by the connector integration elements chosen by the user or indicated by the geographic data integration protection system. The runtime engine may then execute the subsets of code instructions in the order defined by the modeled flow of the connector integration elements given in the integration process flow diagram. In some embodiments, the geographic data integration protection system may define the order in which such subsets of code instructions are executed by the runtime engine without creation of or reference to a visual integration process flow diagram. In such a way, an integration process may be executed without the user having to access, read, or write the code instructions of such an integration process.

In other aspects of an embodiment, a user may initiate a business process data exchange between one cloud service provider 218 and one cloud enterprise 216, between multiple cloud service providers 218 with which the enterprise system 214 has an account, or between multiple cloud enterprise accounts 216. For example, enterprise system 214 may have an account with multiple cloud-based service providers 218, including a cloud-based SalesForce™ CRM account and a cloud-based Oracle™ Netsuite account. In such an embodiment, the enterprise system 214 may initiate business process data exchanges between itself, the SalesForce™ CRM service provider and the Oracle™ Netsuite service provider.

In some embodiments, the runtime engine may be preset to automatically execute at specific times according to a user-defined schedule. In another aspect of such embodiments, a portion of the integration application management system operating at the enterprise system network 214 may check or retrieve updates made to the integration process at the service provider system/server 212 prior to each scheduled execution.

Following execution of an integration process involving transfer of sensitive data between the enterprise system/network 214 and a remotely located source or destination (e.g., first trading partner 208, second trading partner 210, cloud service provider 218, or enterprise cloud 216), a geographic data integration protection system operating at least partially at the service provider system/server 212 or the enterprise system/network 214 may retrieve metadata appended to such sensitive data at the destination location. If the geographic data integration protection system in such an embodiment determines the data model field value traveled through a user-defined barred geographic location during a previous execution of the integration process, the geographic data integration protection system may alter the integration process flow to inhibit repeated movement of the data model field value through such barred geographic location, or seize execution by terminating a portion of the integration process prior to such movement.

In some embodiments, the geographic data integration process may reroute the movement of such sensitive data within the integration process to other servers, not located within the barred geographic location, but allow the integration process to execute fully. For example, an initial execution of an integration process may route a sensitive data model field value through the cloud service provider 218 to reach the first trading partner 208. If the geographic data integration protection system determines cloud service provider 218 servers are located within a user-defined barred geographic location, the geographic data integration protection system in some embodiments may edit the integration process to reroute the sensitive data through the enterprise cloud 216, rather than the cloud service provider 218. The updated integration process may then be transmitted to the enterprise system 214 for execution prior to any future executions of the integration process according to the automatic scheduler.

Figure 3A:
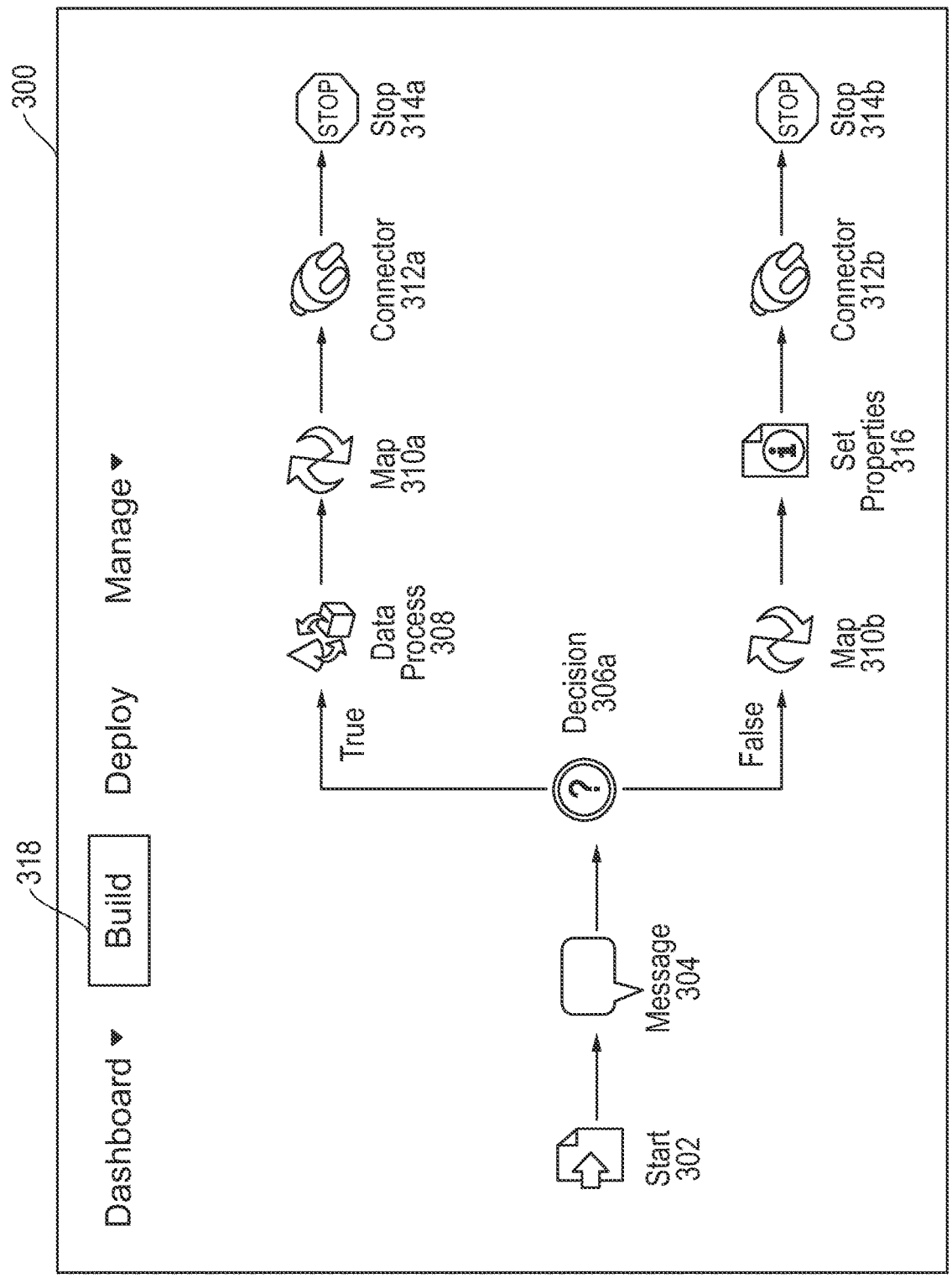
FIG. 3A is a graphical diagram illustrating a user-generated flow diagram of an integration process according to an embodiment of the present disclosure.

FIG. 3A is a graphical diagram illustrating a user-generated flow diagram of an integration process for exchange of electronic data records according to an embodiment of the present disclosure. The flow diagram in an embodiment may be displayed within a portion of a graphical user interface 300 that allows the user to build the process flow, deploy the integration process modeled thereby, manage data model field values manipulated by such an integration process, and to view high-level metrics associated with execution of such an integration process. The user may build the process flow and view previously built process flow diagrams by selecting the "Build" tab 318 in an embodiment. A user may generate a flow diagram in an embodiment by providing a chronology of process-representing integration elements via the use of an integration process-modeling user interface. In some embodiments, the integration process-modeling user interface may take the form of a visual user interface. In such embodiments, the user-selectable elements representing integration sub-processes (e.g. connector integration elements) may be visual icons.

An integration process-modeling user interface in an embodiment may provide a design environment permitting a user to define process flows between applications/systems, such as between trading partner and enterprise systems, between on-site data centers and cloud-based storage modules, or between multiple applications, and to model a customized business integration process. Such an integration process-modeling user interface in an embodiment may provide a menu of pre-defined user-selectable elements representing integration sub-processes and permit the user or the geographic data integration protection system to arrange them as appropriate to model a full integration process. For example, in an embodiment in which the integration process-modeling user interface is a visual user interface, the elements may include visual, drag-and-drop icons representing specific units of work (known as process components) required as part of the integration process. Such a process components in an embodiment may include invoking an application-specific connector to access, and/or manipulate data. In other embodiments, process components may include tasks relating to transforming data from one format to another, routing data down multiple paths of execution by examining the contents of the data, business logic validation of the data being processed, etc.

Each process component as represented by integration sub-process icons or elements may be identifiable by a process component type, and may further include an action to be taken. For example, a process component may be identified as a "connector" component. Each "connector" component, when chosen and added to the process flow in the integration process-modeling user interface, may allow the geographic data integration protection system or a user to choose from different actions the "connector" component may be capable of taking on the data as it enters that process step. Further the integration-process modeling user interface in an embodiment may allow the user to choose the data set or data element upon which the action will be taken. The action and data element the user chooses may be associated with a connector code set, via the integration application management system, which may be pre-defined and stored at a system provider's memory in an embodiment. The integration application management system operating at least partially at a system provider server/system in an embodiment may generate a dynamic runtime engine for executing these pre-defined subsets of code instructions correlated to each individual process-representing visual element (process component) in a given flow diagram in the order in which they are modeled in the given flow diagram, or by the geographic data integration protection system in a non-visual format.

In an embodiment, a user may choose a process component it uses often when interfacing with a specific trade partner or application, and define the parameters of that process component by providing parameter values specific to that trading partner or application. If the user wishes to use this process component, tailored for use with that specific trading partner or application repeatedly, the user may save that tailored process component as a trading partner or component named specifically for that application. For example, if the user often accesses NetSuite™ or SalesForce™, the user may create a database connector process component, associated with a pre-built connector code set that may be used with any database, then tailor the database connector process component to specifically access NetSuite™ or SalesForce™ by adding process component parameters associated with one of these applications. If the user uses this process component in several different integration processes, the user may wish to save this process component for later use by saving it as a NetSuite™ or SalesForce™ process component. In the future, if the user wishes to use this component, the user may simply select the NetSuite™ or SalesForce™ component, rather than repeating the process of tailoring a generic database connector process component with the specific parameters defined above.

As shown in FIG. 3A, such process-representing visual elements may include a start element 302, a message element 304, a map element 310a or 310b, a set properties element 316, a connector element 312a or 312b, and a stop element 314a or 314b. Other embodiments may also include a branch element, a decision element 306a, a data process element 308, or a process call element, for example. A connector element 312a or 312b, and a start element 302 in an embodiment may represent a sub-process of an integration process describing the accessing and/or manipulation of data. The start element 302 in an embodiment may also operate as a connector element.

In an embodiment, a start element 302 may operate to begin a process flow, and a stop element 314a or 314b may operate to end a process flow. As discussed above, each visual element may require user input in order for a particular enterprise or trading partner to use the resulting process. The start element 302 in an embodiment may further allow or require the user to provide data attributes unique to the user's specific integration process, such as, for example, the source of incoming data to be integrated. For example, the user or the geographic data integration protection system may use a connector element to define a connection (e.g., an application managing data upon which action is to be taken), and the action to be taken. A user may use a connector element to further define a location of such data, according to the language and storage structure understood by the application managing such data. In addition, the data to be accessed according to such a start element 302 may be identified by a data model fieldname given in a format that adheres to the code language and storage structure used by the application/location/enterprise at which such a data model field value may be accessed.

A map element 310a or 310b in an embodiment may associate a first data model fieldname for a data model field value being retrieved from a first application or source with a second data model fieldname under which that data model field value will be stored at a second application or destination. A user may also provide a "function" name that describes the purpose for changing the data model fieldnames of the data model field value in such a way. Because a single integration process may transmit data model field values between or among several sources and destinations, a process flow may include several of these mapping elements 310a and 310b, sometimes placed in series with one another. This may result in a single data model field value receiving several different data model fieldnames as it moves from various sources to various destinations throughout the integration process.

A set properties element 316 in an embodiment may allow the user to set values identifying specific files. Set properties elements in an embodiment may associate a user-defined property with a user-defined parameter, similar to a key-value pair definition. For example, a user or the geographic data integration protection system in an embodiment may use a set properties element to set the property "data model fieldname" to a parameter "Shipping Address," in order to identify a specific data model field value entitled "Shipping Address." In some embodiments, this may invoke a call to an API controlling access to the application/location/enterprise managing such a data model field value to search for a data model field value having a data model fieldname that matches one or more of these descriptive phrases, rather than identifying a data model field value having the exact data model fieldname "Shipping Address." For example, a user entering the value "Shipping Address" in an embodiment may invoke a call to locate data model field values having data model fieldnames "Shipping_Address," "shipping_address," "ShippingAddress," "SAddress," etc.

The code sets associated with such property and parameter fields in an embodiment may be written in any programming code language, so long as the code language in which the property is defined matches the code language in which the parameter is also defined. Similarly, the code sets associated with the connection location and action to be taken within a connector element may be written in any programming code language so long as they are consistent with one another. Thus, the process-representing elements in an embodiment may be programming language-agnostic. Using such process-representing elements in an embodiment, a user may model an end-to-end integration process between multiple applications that each use different naming conventions and storage structures for storage of data model field values. As a result, a single data model field value accessed at the start element 302 and transmitted to second or third locations at the connector elements 312a and 312b in an embodiment may be identified at the start element 302 with a completely different data model fieldname (e.g., "Social_Security_Number") than the data model fieldname (e.g., "Title") used to identify the exact same data model field value at the connector elements 312a and 312b.

If a user anticipates a modeled integration process may access, copy, transmit, or otherwise manipulate a data model field value likely to include sensitive information (e.g., personal information protected under the GDPR), the user may provide terms describing such data within a message element 304 in an embodiment. For example, a user may add a message element 304 to the visual flow process within the user interface, which may then prompt the user to provide one or more search terms used to identify potentially sensitive information, as described in greater detail herein. In embodiments described herein, the ways in which such given data model field value information is handled throughout the integration process modeled by the user may be identified, labeled, and tracked, despite the plurality of data model fieldnames used to identify such information throughout the process.

As described herein, the GDPR contains several provisions requiring controllers of personal data (e.g., enterprises engaged in data integration processes) to place an appropriate technical and organization measures to implement data protection principles. The geographic data integration protection system in an embodiment may operate to identify sensitive information and apply added security measures to integration processes involving such sensitive information, to avoid the risk of infringing the GDPR.

In embodiments described herein, code instructions may be searched for one or more integration processes to identify data model field values accessed, copied, transferred, or otherwise manipulated therein that may contain sensitive information. Upon identification of a data model field value associated with a data model fieldname meeting preset search terms provided by the user within the message element 304 and designed to identify sensitive information, the identified data model field value may be labeled as sensitive using one or more of a plurality of labels. Greater security measures may be applied to data model field values identified in such a way as sensitive in some cases. For example, an encryption layer may be added to all data model field values identified as potentially sensitive by including a decision element 306a immediately following the message element 304.

The decision element 306a in such an embodiment may route incoming data model field values based on whether they meet a preset criterion. For example, the decision element 306a may be associated with a statement, such as, "the incoming data model field value meets one or more of the search criteria provided by the user within the message element 304." If such an assigned statement proves true (e.g., the incoming data model field value meets the search terms for sensitive information), this may indicate the incoming data model field value may contain personal identification information, and the decision element 306a may route the integration process including that data model field value toward data process element 308, which may operate to apply added security, such as an encryption algorithm to the integration process. If such an assigned statement proves false, this may indicate the incoming data model field value likely does not contain personal identification information, and the decision element 306a may route the integration process toward the map element 310b, and for more direct delivery to the destination defined at connector 312b. In some embodiments, the destination defined at connector element 312a may be the same destination defined at connector element 312b. In such an embodiment, the decision element 306a may operate to route all data model field values to the same destination, but may simply add the encryption defined by the data process element 308 to sensitive data.

Figure 3B:
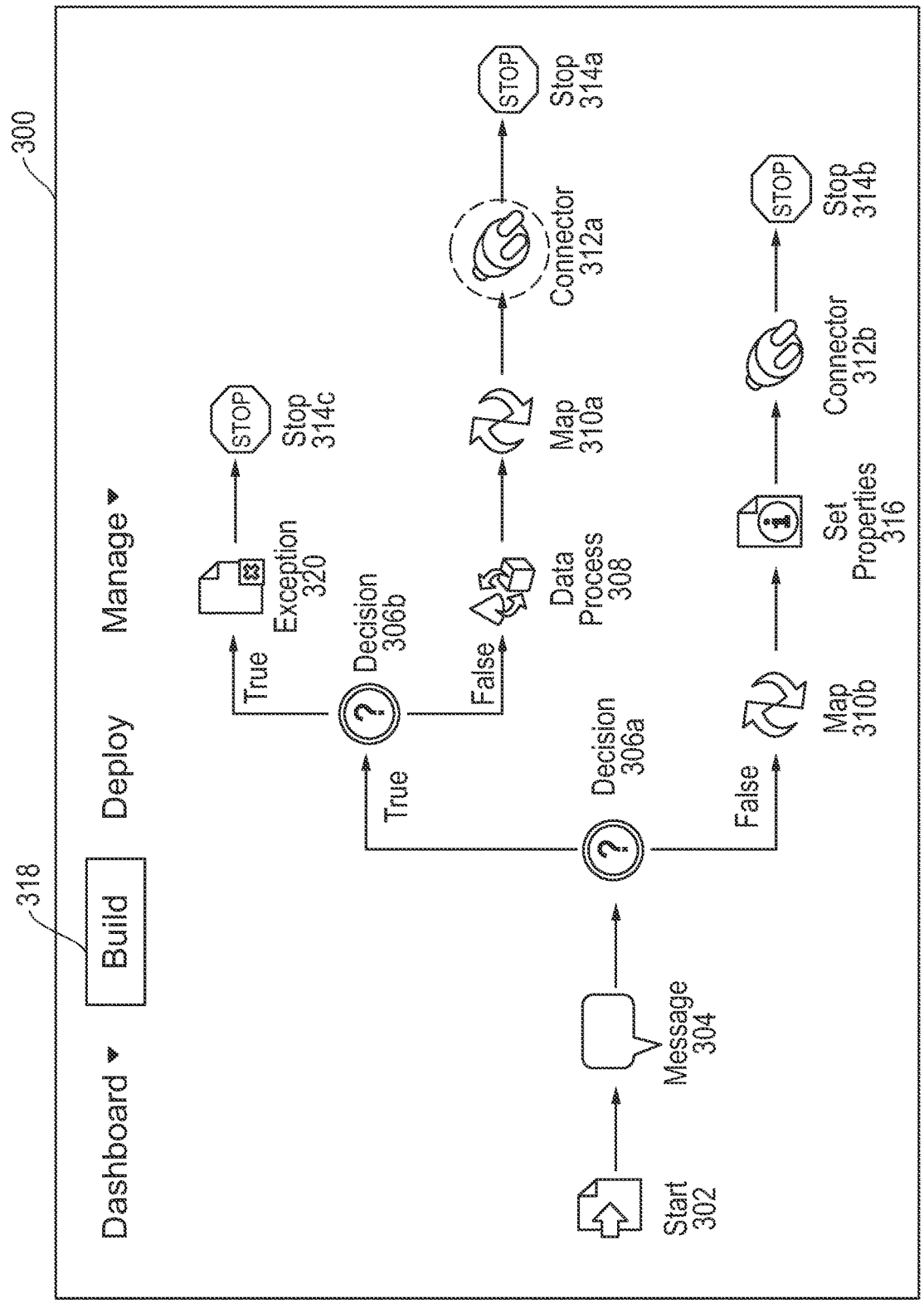
FIG. 3B is a graphical diagram illustrating a user-generated flow diagram of an integration process providing added security according to an embodiment of the present disclosure.

FIG. 3B is a graphical diagram illustrating a user-generated flow diagram of an integration process providing added security for exchange of electronic data records containing personal information according to an embodiment of the present disclosure. As described herein, security of personal information has become an increasing concern during the $21^{st}$ century, resulting in governmental regulations such as the GDPR, requiring controllers of personal data to implement appropriate data protection principles, and provide adequate explanation of the ways in which such personal data has been manipulated or transferred. The geographic data integration protection system in an embodiment may address these concerns by tracking the physical locations where data is stored or transferred throughout such an integration process, and, in some circumstances, inhibiting transfer of data to physical locations the user has identified as barred, or off-limits.

The geographic data integration protection system in an embodiment may determine that a data model field value has passed through a server in a user-defined barred geographic location during a previous execution of an integration process. For example, the geographic data integration protection system in an embodiment may determine that the server for the destination identified within the connector element 312a is physically located in a geographic location barred by the user. In such an embodiment, the geographic data integration protection system may label the connector 312a as a barred location for sensitive data. In some embodiments, the geographic data integration protection system may notify the user of such an identification by highlighting (e.g., circling) the visual connector element 312a within the visual flow chart displayed by the graphical user interface 300.

The geographic data integration protection system in some embodiments may update or edit the flow diagram for the integration process to terminate a portion of the integration process that allows for passage of the sensitive data model field value through the barred location. For example, the geographic data integration protection system in an embodiment may edit the process flow modeled within the "Build" tab 318 of the graphical user interface 300 to avoid such a risk. The geographic data integration protection system in such an embodiment may insert a second decision element 306b through which all data model field values identified as sensitive may pass. The decision element 306b may be associated with a statement, such as, "the downstream connector element 312a has been identified as being located in a barred geographic location." If such an assigned statement proves true, the decision element 306b may route the integration process including that data model field value toward the exception element 320, which may operate to automatically terminate the transfer of that data model field value. If such an assigned statement proves false, the decision element 306b may route the integration process toward the data process element 308, for encryption and delivery to the destination defined at connector element 312a. In other embodiments, the geographic data integration protection system may insert a new connector element (not shown), rather than the exception element 320. In such an embodiment, the new connector element may identify a different destination than the destination defined at connector element 312a. In such a way, the geographic data integration protection system may automatically update an integration process to avoid transfer of data to barred geographic locations, as defined by the user.

In some embodiments, the geographic data integration protection system may also highlight (e.g., circle) a visual element in an embodiment in which a transfer of a data model field value pursuant to code instructions associated with that visual element failed or was terminated for some reason. For example, in an embodiment in which the start element 302 is associated with code instructions for retrieving from an Application A a data model field value having a data model fieldname "Social_Security_Number," Application A may abort or disallow such a retrieval. Application A may disallow such an action because it has separately labeled that data model field value as secure information, for example. In such an embodiment, the integration application management system may register an error has occurred during the integration process (e.g., by identifying failure to retrieve the data model field value from Application A), and highlight (e.g., circle) the visual element (e.g., start 302) at which the error occurred.

The integration application management system in such an embodiment may further prompt the geographic data integration protection system to determine whether the data model field value that failed to transfer falls within one of the user-defined dataset labels indicating it may contain sensitive personal information. If the geographic data integration protection system in such an embodiment determines the data model field value that failed to transfer falls within one of the user-defined categories, the geographic data integration protection system may indicate to the user that this may be the cause of the error. Further, the geographic data integration protection system in such an embodiment may automatically update any statistics available to the user to reflect that the data model field value was not actually transmitted during the previous execution. In such a way, the geographic data integration protection system may provide accurate and up to date reports describing which data model field values labeled as containing potentially sensitive personal information have been manipulated during a given integration process, and how.

Figure 4:
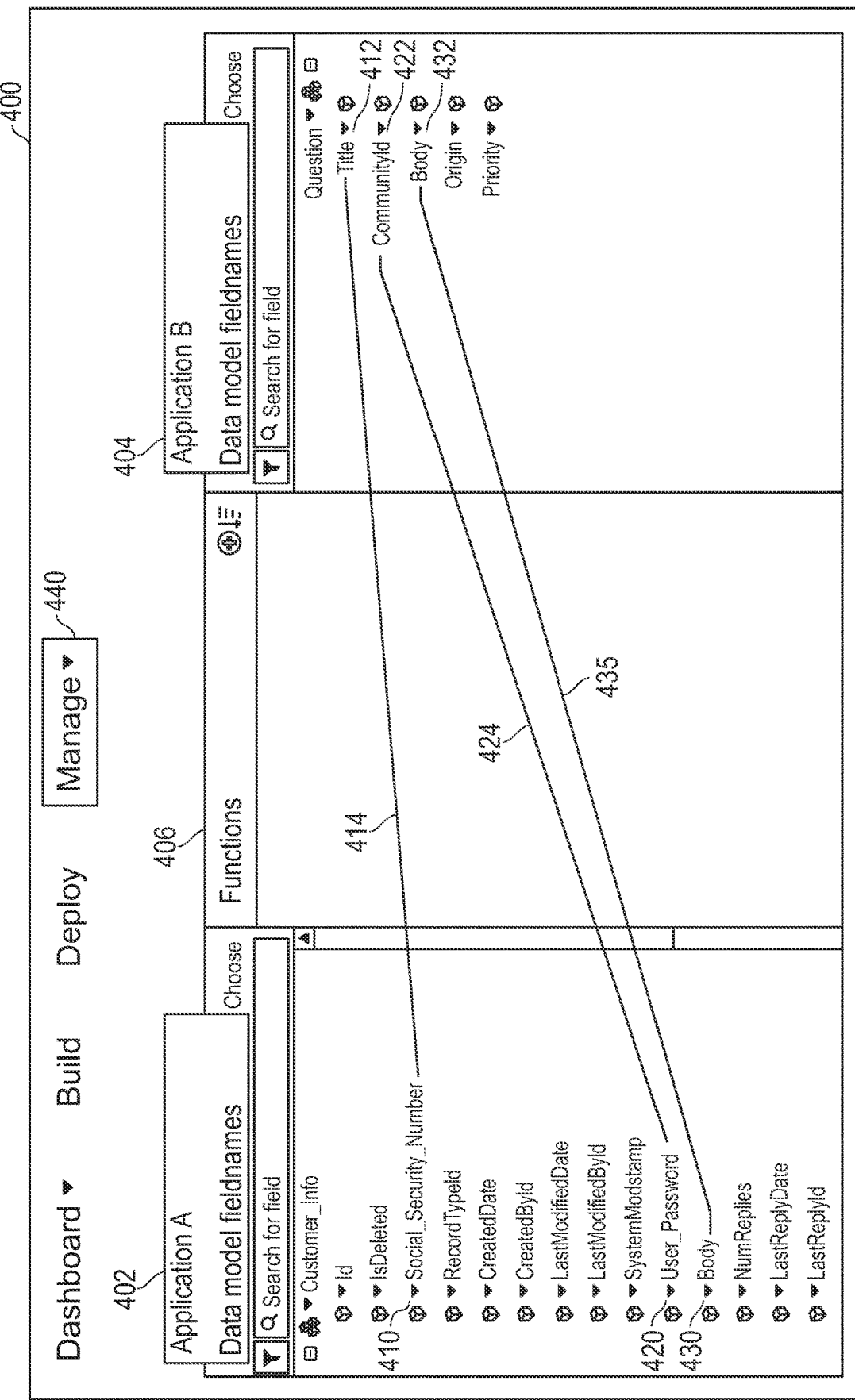
FIG. 4 is a graphical diagram illustrating mapping between multiple data model fieldnames for a single data model field value throughout an integration process according to an embodiment of the present disclosure.

FIG. 4 is a graphical diagram illustrating fieldname lineage mapping between multiple data model fieldnames, each associated with a separate application for a single data model field value throughout an integration process according to an embodiment of the present disclosure. As described herein, in addition to labeling a data model field value as falling within one of the preset categories describing types of personal information, the geographic data integration protection system may also track the movement of such a data model field value throughout the integration process, to assist with the type of reporting required by the GDPR.

A fieldname lineage map may be displayed in an embodiment via a graphical user interface 400, which may correspond to the graphical user interface 300 described with reference to FIGS. 3A-3B. A user may create, view, or edit a fieldname lineage map in an embodiment by selecting the "Manage" tab 440 in an embodiment. An example fieldname lineage map in an embodiment may include a first column 402 listing one or more data model fieldnames for data model field values accessed, transmitted, copied, or otherwise manipulated by an "Application A," and a column 404 listing one or more data model fieldnames for data model field values accessed, transmitted, copied, or otherwise manipulated by an "Application B."

In some embodiments, a data model field value manipulated by Application A at one step within an integration process may also be manipulated by Application B at a later step within the same integration process. In other words, such an integration process in an embodiment may involve transmitting a data model field value from Application A to Application B. Thus, one or more of the data model fieldnames listed in column 402 may describe a data model field value that is also described by one or more of the data model fieldnames listed in column 404. For example, an integration process may include transmitting a data model field value that includes a social security number, having a data model fieldname "Social_Security_Number" 410, locatable by Application A, to Application B. Such an integration process may also involve storing the data model field value that includes the social security number under a data model fieldname "Title" 412, locatable by Application B. Thus, a single data model field value that includes a social security number may be given two separate data model fieldnames (e.g., "Social_Security_Number" 410, and "Title" 412) at two separate points within the same integration process. In such an embodiment, the mapping user interface 400 may associate the data model fieldname "Social_Security_Number" 410 from column 402 with the data model fieldname "Title" 412 from column 404 using a mapping connector 414.

As described herein, users of the visual user interface describing the flow of the integration process may use map elements to associate a first data model fieldname for a data model field value being retrieved from a first application or source with a second data model fieldname under which that data model field value will be stored at a second application or destination. For example, a previously created map element may associate the data model fieldname "Social_Security_Number," accessible by Application A with the data model fieldname "Title," accessible by Application B. This previously created map element may be used to make the link 414 between the data model fieldname "Social_Security_Number" 410 and the data model fieldname "Title" 412 within the fieldname lineage map.

Users may also provide, via the mapping element, an operation name that describes the purpose for changing the data model fieldnames of the data model field value in such a way. For example, the previously created mapping element may identify "Transfer of Vendor Contacts" as the operation name for changing the data model fieldname of the data model field value transferred from Application to Application B from "Social_Security_Number" to "Title." This user-defined function may be identified within the mapping element within the functions column 406 of the fieldname lineage map.

In another example embodiment, Application A may provide a data model fieldname "User Password" 420 to describe a data model field value that includes a user password, and Application B may provide a data model fieldname "CommunityID" 422 to describe the same data model field value. The fieldname lineage map in an embodiment may associate the data model fieldname "User_Password" 420 from column 402 with the data model fieldname "CommunityID" 422 from column 404 using a mapping connector 424. In still another example, Application A may provide a data model fieldname "Body" 430 to describe a data model field value for which Application B has also provided the data model fieldname "Body" 432. The fieldname lineage map in an embodiment may associate the data model fieldname "Body" 430 from column 402 with the data model fieldname "Body" 432 from column 404 using a mapping connector 435.

A data model field value may be labeled sensitive information falling into one or more user-defined categories (e.g., personal, financial, security, national, sensitive, or health) in some cases. For example, a user in an embodiment may label data model field values having a data model fieldname including the search term "social" as sensitive information (e.g., under the "national" category that includes social security numbers). In such an embodiment, the data model field value having the data model fieldname "Social_Security_Number" 410 may be labeled as falling within the "national" category of sensitive information. The data model fieldname "title" 412 in an embodiment may also be labeled as "national," despite not meeting the search term "social," because the data model fieldname "Title" 412 is linked via 414 to the data model fieldname "Social_Security_Number" 410.

As described herein, the geographic data integration protection system in an embodiment may trace the physical locations through which data moves during a first execution of an integration process. For example, a user within an enterprise system or network may execute an integration process to transfer a data model field value between a source application or location and a destination application or location. As the data model field value travels between the source and destination, metadata identifying the servers (e.g., by URL, hostname, IP address, ports, databases, etc.) may be appended to the data model field value. The geographic data integration protection system in an embodiment may analyze such metadata using a geolocation service to identify the geographic location of each identified server through which the data model field value travelled as it moved from the source to the destination. Further, the geographic data integration protection system may update the fieldname lineage map 400 to associate each manipulation of the data model field value made throughout the integration process with the identified geographic location at which each manipulation occurred. In such a way, the geographic data integration protection system in embodiments may provide a lineage of each physical location at which a given data model field value is stored, transmitted, copied, or otherwise manipulated during an integration process.

FIG. 5 is a graphical user interface for searching, displaying, and generating reports describing data model field values labeled as sensitive information that are involved in an integration process according to an embodiment of the present disclosure. As described herein, upon request of an EU citizen whose personal data has been included within an integration process, an adherent to the GDPR (e.g., entity performing data integration processes) must provide adequate explanation of the ways in which such personal data has been manipulated or transferred. In addition, one way for an enterprise system executing data integration processes to protect against infringement involves tracking the content of data model field values being integrated, and the ways in which such data is being manipulated.

Similar methods may also assist in deterring or lessening potentially hefty fines if an infringement should occur. The level of fine levied against a non-compliant entity is determined according to a variety of factors, that include the extent of the infringement (e.g., number of people affected and damage caused thereto), mitigating acts taken by the non-compliant entity following infringement, preventative measures taken by the non-compliant entity prior to the infringement, what types of data were impacted by the infringement, and whether the non-compliant entity promptly notified those who were affected by the infringement, among others. In the unfortunate event of an infringement, enterprises executing data integration processes may at least decrease the amount of the resultant penalties by providing detailed metrics describing data affected by each integration process, individuals whose information was incorporated within such data, and the ways in which such data was accessed, copied, transferred, or otherwise manipulated in an infringing integration process. Such detailed information may indicate preventative and mitigating measures were taken, and may assist in notification of individuals impacted.

FIG. 5 illustrates the display of information describing properties of data model field values and the ways in which an integration process manipulates such data model field values, in a searchable format, for easy generation of reports complying with GDPR requirements. For example, the graphical user interface 500 (which may correspond to the graphical user interfaces 300, and 400, described with reference to FIGS. 3A-3B, and 4, respectively) may allow a user to view properties describing all data model field values labeled under any of the sensitive categories described herein occurring within a single integration process, or across a plurality of integration processes, by selecting the "Manage" button 524. A user may initiate a search for data model field values labeled as sensitive in an embodiment by selecting a process executed on one or more data model field values in one or more integration processes at the search field 516. For example, an integration process that involves transmitting a plurality of data model field values, each describing different contact information for a vendor, between a first application (e.g., NetSuite™) and a second application (e.g., SalesForce™). Such an integration process may be named "attach contact to vendor" in an embodiment. A user may search each of the data model field values transmitted between these applications pursuant to the "attach contact to vendor" process within the search field 516 in order to view a description of the ways in which that process manipulated data model field values identified as sensitive or likely to include personal information. In other embodiments, the user may search across multiple processes simultaneously to view descriptions of the ways in which multiple processes manipulate similarly labeled data model field values. In still other embodiments, the user may search across all integration processes, or may narrow search results generated with respect to one or more identified processes by entering a search term within the field 518.

The graphical user interface 500 in an embodiment may display information describing the types of data model field values labeled sensitive and the ways in which the selected integration processes manipulated such data model field values. For example, column 504 may identify the data model fieldname for each data model field value labeled as sensitive information, and column 502 may list the category of sensitive information within which each data model field value falls, including personal, security, national, financial, sensitive, or health. As described herein, each of these categories is user-specified. Thus, other embodiments may include any category designation provided by a user, and each of these categories may be associated with preset, user-defined data model fieldname search terms. For example, a user may define a sensitive dataset label category for intellectual property. Although embodiments of the present disclosure describe search terms for identifying data model field values containing potentially sensitive personal information, it is contemplated that users may provide other search terms to identify data model field values for purposes other than security of personal information. For example, a user in an embodiment may provide a search term "http" and a user instruction to label data model field values associated with data model fieldnames matching this search term as likely to be managed in a cloud computing space.

The graphical user interface 500 may further provide information regarding the ways in which the integration process identified in field 516 manipulated that data model field value. For example, column 506 may describe the shape of the visual element associated with the code instructions in which the data model fieldname listed in column 504 was identified pursuant to the user-defined search for sensitive information. More specifically, in an embodiment described with reference to FIG. 3A, each of the plurality of visual elements selected by the user for inclusion within the integration process modeled by the visual flow may be associated with executable code instructions. For example, the user may insert a start element 302 within a process flow for attaching contact information to a vendor to represent retrieving a data model field value associated with a data model fieldname "Social_Security_Number" from a first application (e.g., NetSuite™). As another example, the user may also insert a connector element 312a or 312b within the same process flow to represent transmitting the data model field value retrieved at element 302 to a second application (e.g., SalesForce™) and storing it with a data model fieldname "Title." The user in such an embodiment may name the start element 302 "Application A vendor lookup," and name the connector elements 312a and 312b "Application B vendor store." Each of these visual elements may represent a code set that identifies the data model field value being transmitted between Application A and Application B in an embodiment. For example, the start element 302 may represent executable code instructions for retrieving a data model field value having a data model fieldname "Social_Security_Number," and the connector element 312a or 312b may represent executable code instructions for storing that same data model field value under a data model fieldname "Title."

In an embodiment described with reference to FIG. 4, the geographic data integration protection system may identify both the data model fieldname "Social_Security_Number" 410 and its linked data model fieldname "Title" 412 as national sensitive information. This may be accomplished by searching the code instructions represented by the visual elements within the process flow for a user-specified search term (e.g., "social"). Returning to FIG. 5, in such an embodiment, the graphical user interface may display the data model field value having the data model fieldname "Social_Security_Number" as falling within the "National" category within the top row, and the (same) data model field value having the data model fieldname "Title" as falling within the "National" category within the second from the top row. In the top row, the graphical user interface 500 may associate the data model fieldname "Social_Security_Number" in column 506 with a visual element having a connector shape, because it is associated with the start element 302 within the modeled process flow, and may associate the data model fieldname "Title" with a connector shape, because it is associated with the connector element 312a or 312b.

Column 508 in an embodiment may describe the name assigned to the visual element representing the code instructions in which the data model fieldname listed in column 504 was identified. For example, in the top row of the graphical user interface 500, the data model field value having the data model fieldname "Social_Security_Number" identified in the code instructions represented by the start element 302 may be associated in column 508 with the name "Application A vendor lookup," that the user assigned to the visual element 302. As another example, in second from the top row of the graphical user interface 500, the data model field value having the data model fieldname "Title" identified in the code instructions represented by the connector element 312a or 312b may be associated in column 508 with the name "Application B vendor store," that the user assigned to the connector element 312a or 312b.

In an embodiment, a user may choose a process component it uses often when interfacing with a specific application, and define the parameters of that process component by providing parameter values specific to that application. If the user wishes to use this process component, tailored for use with that specific application repeatedly, the user may save that tailored process component and name it based on the specific application for which it is tailored. For example, if the user uses a process component for interfacing with NetSuite™ or SalesForce™ in several different integration processes, the user may wish to save this process component for later use by saving it as a NetSuite™ or SalesForce™ process component. In an embodiment, if a user has saved a connector element with a name identifying the application accessed by that connector element, the graphical user interface 500 may display that application name within column 510. For example, the user interface 500 may associate the connector element named "Application A vendor lookup," as identified in the top row of column 508 with the type "Application A" in column 510. As another example, the user interface 500 may associate the connector element named "Application B vendor store," as identified in the second to top row of column 508 with the type "Application B" in column 510.

Column 512 in an embodiment may identify a geographic location of a server where a data model field value identified as sensitive has been stored, pursuant to, or as described by the integration process selected by the user in field 516. For example, the integration process named "Attach Contact to Vendor" may execute code instructions to retrieve a data model field value having a data model fieldname "Social_Security_Number" from a NetSuite™ server located in Chile and transmit that data model field value for storage under the data model fieldname "Title" at a SalesForce™ server located in the United States. In such an embodiment, the graphical user interface 500 may list both the United States and Chile within the column 512. In other embodiments, the column 512 may list each of several physical locations through which a data model field value passes in order to move from the source location to the final destination location. The geographic data integration protection system in an embodiment may determine these locations, as described herein, by geolocating each of the servers through which a data model field value travels during an executed integration process (including intermediate stops between a source and a destination), as identified in metadata appended to the data model field value at the final destination of that integration process.

In some embodiments, the geographic data integration protection system may highlight or otherwise notify the user of the graphical user interface 500 that a data model field value marked as sensitive has passed through a geographic location identified by the user as unsafe or barred. For example, the geographic data integration protection system in an embodiment may receive a user instruction to identify servers in Chile as unsafe for storage or receipt of data model field values marked sensitive. In such an embodiment, the geographic data integration protection system may highlight or otherwise call the user's attention to each of the rows displayed in the graphical user interface 500 in FIG. 5, to indicate previous passage or storage of sensitive data model field values at a server within Chile.

In some embodiments, the user may even narrow this instruction to identify a given geographic location as unsafe for storage or receipt of data model field values falling within only one of the user-defined dataset label categories. For example, in an embodiment in which a user has defined a dataset label category for intellectual property, the geographic data integration protection system may receive a user instruction to identify servers in the United States as inappropriate for storage or receipt of data model field values marked "intellectual property." This may be the case, for example, if the user is transferring data describing an invention on which the user has yet to apply for a patent within the United States. In such a scenario, the geographic data integration protection system may highlight or otherwise call the user's attention to rows within the graphical user interface 500 where data model field values marked "intellectual property" have moved through servers within the United States. In still other embodiments, the user may search for such entries by entering "intellectual property" and "United States" within the search box 518.

In an embodiment in which a user searches across several processes using the search field 518, the graphical user interface 500 may display data model field values matching the user-provided search term that are the subject of a plurality of processes. In such an embodiment, the graphical user interface 500 may list each of these data model field values, and may associate the data model fieldnames for each of these data model field values given in column 504 with the name of the process, given in 514, in which that data model field value is accessed, transferred, copied, or otherwise manipulated.

A user may instruct the graphical user interface to display results in the tabular view shown in FIG. 5, or in a text format by toggling the display format button 520. Output of searches made using the graphical user interface 500 in an embodiment may be exported or printed in a variety of different coding languages. For example, a user in an embodiment could select one of the listed data model fieldnames or rows displayed in the graphical user interface, then instruct the geographic data integration protection system to export the code instructions where that data model fieldname was identified and labeled as sensitive information by selecting the export button 522. Upon selection of the export button 522 in an embodiment, the user may be prompted to choose from a plurality of coding formats (e.g., JSON, XML) in which the user wishes those data structures to be displayed. A user may also export the entire tabular output of the information displayed within the graphical user interface 500 in some embodiments.

In some cases, data model field values may fail to transfer from a source to a destination as identified within an integration process flow diagram and accompanying code instructions. For example, in an embodiment described with reference to FIG. 3B, in which the start element 302 is associated with code instructions for retrieving from an Application A a data model field value having a data model fieldname "Social_Security_Number," Application A may abort or disallow such a retrieval. In such an embodiment, the geographic data integration protection system may determine the data model field value that failed to transfer falls within one of the user-defined categories, and may indicate to the user that this may be the cause of the error. For example, the geographic data integration protection system in such an embodiment may highlight the top row of the table displayed on the graphical user interface 500 to indicate the code instructions associated with the start element failed to execute properly.

Further, the geographic data integration protection system in such an embodiment may automatically update any statistics available to the user to reflect that the data model field value was not actually transmitted during the previous execution. For example, if Application A did not release the data model field value associated with the data model fieldname "Social_Security_Number," the integration application management system in such an embodiment may not have stored a data model field value with the data model fieldname "Title" (or may have stored a null or empty field) at Application B. In such an embodiment, the geographic data integration protection system or the integration application management system may remove the second from the top row of the table displayed on the graphical user interface 500, to accurately reflect that the data model field value did not actually transfer pursuant to the previously executed integration process. Any visual representations of such data, other than tabular or textual format (e.g., pie chart, bar chart, etc.) generated based on the information shown in the graphical user interface 500 may also be edited to reflect the failure of the data model field value to transmit. In such a way, the geographic data integration protection system in an embodiment may provide an accurate and up to date report of which data model field values containing personal information were accessed, transferred, or otherwise manipulated during an integration process and how, as well as the applications/locations/enterprises at which such access or manipulation occurred.

Figure 6:
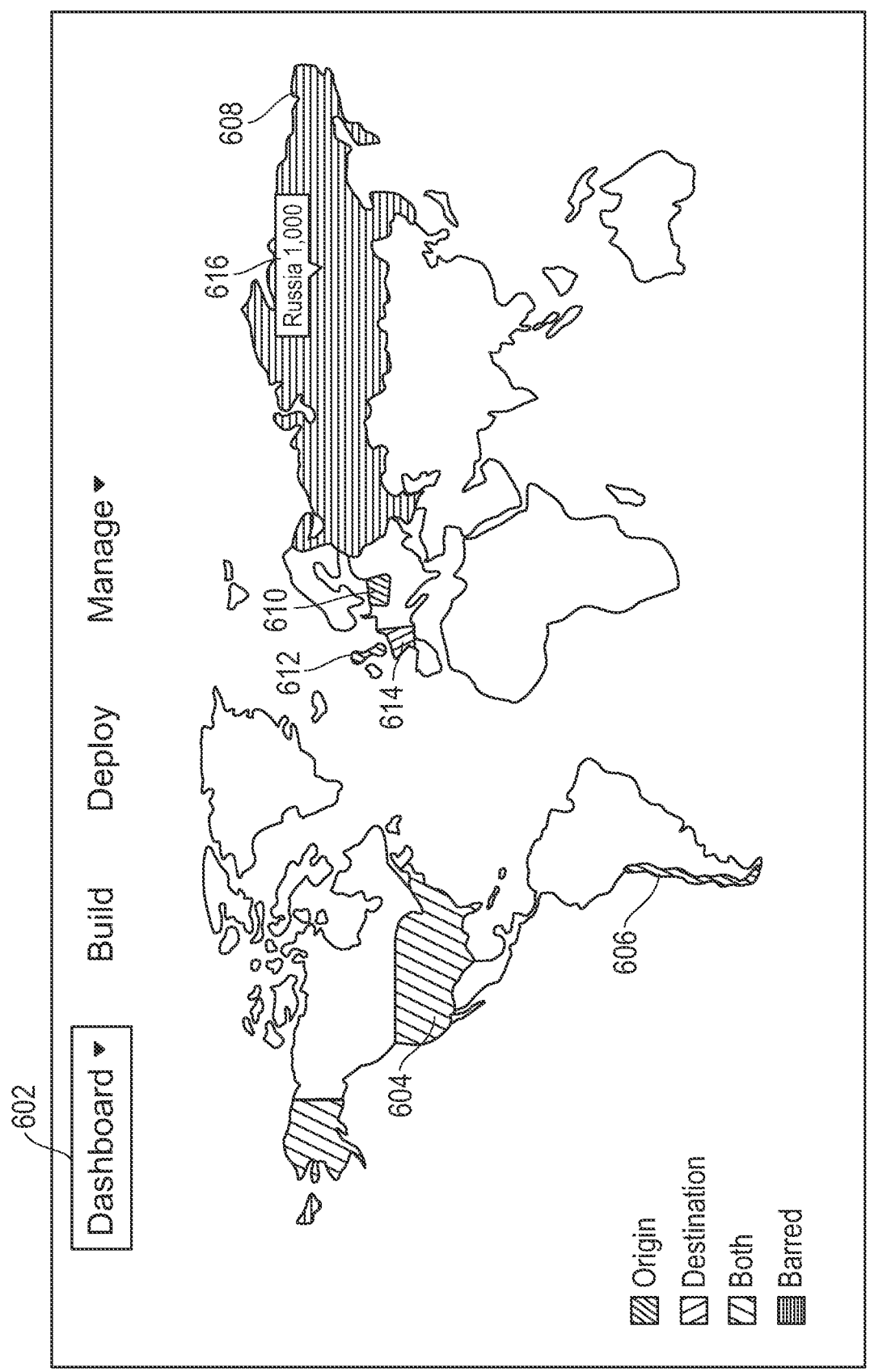
FIG. 6 is a graphical diagram illustrating a graphical user interface for viewing geographical movement of sensitive data according to an embodiment of the present disclosure.

FIG. 6 is a graphical diagram illustrating a graphical user interface for viewing geographical movement of sensitive data during a previously executed integration process according to an embodiment of the present disclosure. As described herein, there is a need for enterprises executing an integration process to track each of the physical locations where data is stored or transferred throughout such an integration process, including intermediate stops between the source and final destination where data model field values may have been stored temporarily. For example, an enterprise may wish to avoid the transfer of data including intellectual property to countries in which patents on such subject matter have yet to be filed. As another example, enterprises may view security of servers in certain geographical location to be questionable (e.g., in countries in which data protection regulations are not applied or enforced). In such scenarios, a method of notifying the user of a potential risk is needed.

The geographic data integration protection system in an embodiment may trace each of the physical locations through which data moves during a first execution of an integration process, and reporting the movement of potentially sensitive data during such a process. The geographic data integration protection system in an embodiment may determine each of these locations, as described herein, by geolocating each of the servers through which a data model field value travels during an executed integration process, as identified in metadata appended to the data model field value at the final destination of that integration process.

Upon identification of the locations of servers through which data model field values identified as sensitive has travelled during an execution of an integration process, the geographic data integration protection system in an embodiment may display these locations via the "Dashboard" submenu 602. The Dashboard 602 of the graphical user interface 600 may display a map of the globe or portions thereof through which a data model field value identified as meeting a user-defined dataset label has passed in a previously executed integration. In other embodiments, the map displayed within the graphical user interface 600 may provide a view of a smaller region, such as within a single continent, country, city, state, or preset radius of distance from specific GPS coordinates.

As an example, a data model field value labeled as "National Sensitive" (or other user-defined sensitive category) may have passed through a plurality of servers located in Chile, Russia, Germany, and the UK prior to reaching an end destination in France. The geographic data integration protection system in such an embodiment may highlight or otherwise call the user's attention to each of these countries. The geographic data integration protection system in an embodiment may further define whether the highlighted locations were the original source for the data model field value, the final destination, or a stop along the way (identified as "both"). For example, the United States may labeled at 604 as the source for the data model field value transmitted during the previously executed integration process, and France may be labeled at 614 as the final destination. The geographic data integration protection system in such an embodiment may also label Chile 606, Russia 608, Germany 610, and the UK 612 as "both," indicating the data model field value may have passed through servers within these locations on the way from the US 604 to France 614.

The geographic data integration protection system may further highlight countries the user has designated as barred within the graphical user interface 700 in an embodiment. For example, a user may have identified Russia as a barred location in an embodiment. In such an example embodiment, the geographic data integration protection system may label Russia 608 as barred. The geographic data integration protection system in an embodiment in which a sensitive data model field value has been identified as passing through a barred geographic area (e.g., Russia 608) may also display the number of sensitive data model field values that passed that area. For example, the geographic data integration protection system in such an embodiment may display the number 1,000 at 616 to indicate that one thousand sensitive data model field values passed through the barred country of Russia 608 pursuant to a previously executed integration process. Defining the overall movement of the data model field values pursuant to such a process, as well as the volume of sensitive data model field values passing through barred countries may assist enterprises in determining how best to manage such data model field values in future data integration process executions.

Figure 7:
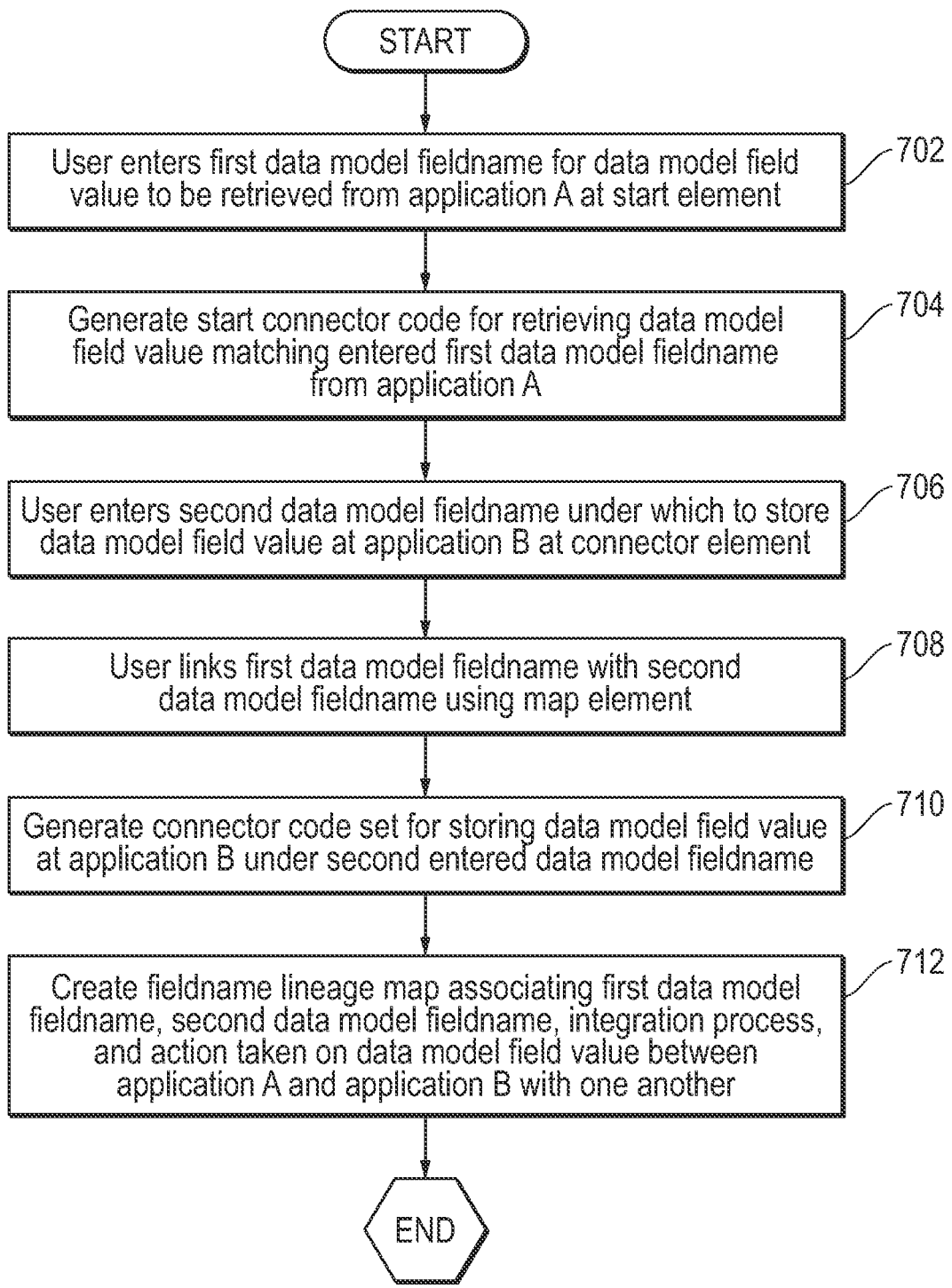
FIG. 7 is a flow diagram illustrating a method of mapping multiple data model fieldnames for a single data model field value together according to an embodiment of the present disclosure.

FIG. 7 is a flow diagram illustrating a method of mapping multiple data model fieldnames for a single data model field value integrated between multiple applications, locations, or enterprises together according to an embodiment of the present disclosure. At block 702, a user may enter a first data model fieldname for a data model field value to be retrieved from an application A at a start element of a visual flow chart in an embodiment. For example, in an embodiment described with reference to FIG. 3A, a user may insert a start element 302 within a process flow for attaching contact information to a vendor. In such an embodiment, the user may use start element 302 to identify a data model field value having a first data model fieldname to retrieve from an Application A. For example, the user may use start element 302 to identify a data model field value having a first data model fieldname "Social_Security_Number" from the NetSuite™ application.

The integration application management system in an embodiment may generate a start code set for retrieving the data model field value matching the entered first data model fieldname from Application A at block 704. As described herein, the integration application management system in an embodiment may associate each of the plurality of visual elements selected by the user for inclusion within the integration process modeled by the visual flow with executable code instructions. Each set of connector code instructions in an embodiment may include code instructions executable to perform an action on a data model field value (e.g., the data model field value matching the user-specified data model fieldname given in block 702). These code sets may be written in any programming code language.

At block 706, a user may enter, within a second connector element, a second data model fieldname under which to store the data model field value at Application B. For example, the user may insert a connector element 312*a* or 312*b* within the same process flow that includes start element 302 for attaching contact information to a vendor. The user may insert connector element 312*a* or 312*b* to represent transmitting the data model field value retrieved at element 302 to a second application. For example, the user may insert connector element 312*a* or 312*b* for transmitting the data model field value retrieved at element 302 to SalesForce™, and for storing it with a data model fieldname "Title."

The integration application management system in an embodiment may receive a user instruction linking the first data model fieldname to the second data model fieldname via a map element at block 708. As described herein, users of the visual user interface describing the flow of the integration process may use map elements to associate a first data model fieldname for a data model field value being retrieved from a first application or source with a second data model fieldname under which that data model field value will be stored at a second application or destination. For example, in an embodiment described with reference to FIG. 4, a previously created map element may associate the data model fieldname "Social_Security_Number," accessible by Application A with the data model fieldname "Title," accessible by Application B. The geographic data integration protection system in an embodiment may use this previously created map element to make the link 414 between the data model fieldname "Social_Security_Number" 410 and the data model fieldname "Title" 412 within the fieldname lineage map.

The integration application management system in an embodiment may generate a connector code set for storing the data model field value at Application B under the second entered data model fieldname at block 710. The integration application management system in an embodiment may associate the connector visual element 312*a* or 312*b* with code instructions executable to perform an action (e.g., store) on a data model field value (e.g., the data model field value matching the user-specified data model fieldname given in block 704). As described herein, these code sets may be written in any programming code language. Thus, the process-representing elements in an embodiment may be programming language-agnostic. Using such process-representing elements in an embodiment, a user may model an end-to-end integration process between multiple applications that each use different naming conventions and storage structures for storage of data model field values. As a result, a single data model field value accessed at the start element 302 and transmitted to a second location at the connector element 312*a* or 312*b* in an embodiment may be identified at the start element 302 with a completely different data model fieldname (e.g., "Social_Security_Number") than the data model fieldname (e.g., "Title") used to identify the exact same data model field value at the connector element 312*a* or 312*b*.

At block 712, the geographic data integration protection system in an embodiment may create a fieldname lineage map associating the first data model fieldname, second data model fieldname, integration process, and action to be taken on the data model field value between Application A and Application B with one another. For example, in an embodiment described with reference to FIG. 4, the geographic data integration protection system may map each data model fieldname given to a given data model field value throughout an integration process, based on user-defined links provided via the map element in block 708. Such a fieldname lineage map in an embodiment may identify which of these data model fieldnames was applied at each application/location/enterprise involved in the integration process, and the manipulation or action (e.g., listed within column 406) performed by each of these applications/locations/enterprises during the integration process. More specifically, the geographic data integration protection system in an embodiment may map a link 414 between the data model fieldname "Social_Security_Number" 410 used by the NetSuite™ application to describe a data model field value, and the data model fieldname "Title" 412 used by the SalesForce™ application to describe the same data model field value. In such a way, the geographic data integration protection system may track all data model fieldnames given to a single data model field value throughout an integration process in an embodiment. The method may then end.

Figure 8:
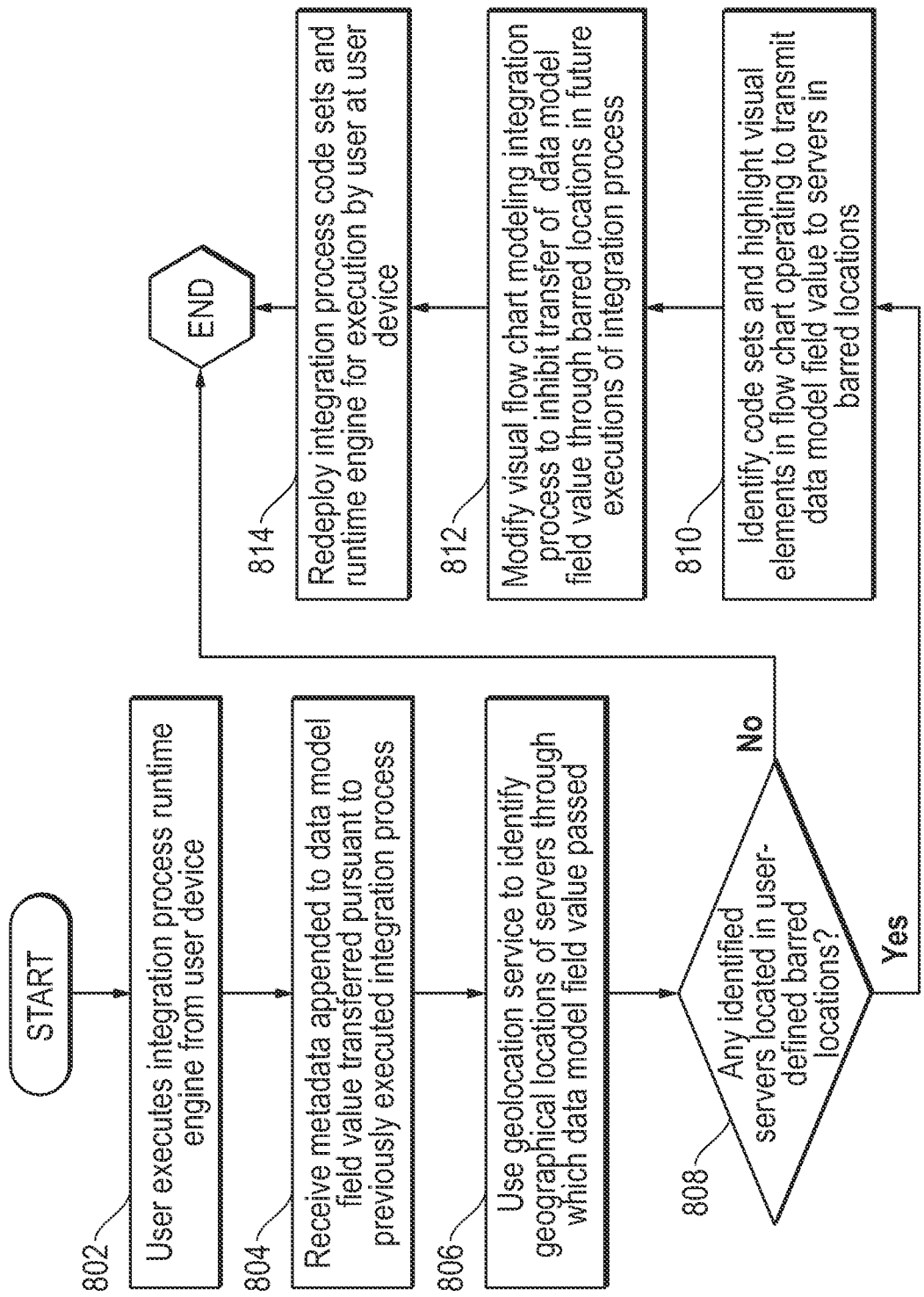
FIG. 8 is a flow diagram illustrating a method of tracking geographic movement of sensitive data model field values according to an embodiment of the present disclosure.

FIG. 8 is a flow diagram illustrating a method of tracking geographic movement of sensitive data model field values pursuant to a previously executed integration process according to an embodiment of the present disclosure. As described herein, security of personal information has become an increasing concern during the 21$^{st}$ century, resulting in governmental regulations such as the GDPR, requiring controllers of personal data to implement appropriate data protection principles, and provide adequate explanation of the ways in which such personal data has been manipulated or transferred. The geographic data integration protection system in embodiments may provide a lineage of each physical location at which a given data model field value is stored, transmitted, copied, or otherwise manipulated during an integration process. Further, the geographic data integration protection system in an embodiment may alert the user to a potential risk prior to subsequent executions of an integration process, or by inhibiting such an execution, either partially or wholly.

At block 802, a user may execute an integration process runtime engine from an enterprise system. For example, in an embodiment described with reference to FIG. 2, upon a user modeling an integration process using a visual flow chart, the service provider system/server 212 in an embodiment may generate a run-time engine capable of executing the pre-defined subsets of code instructions represented by the connector integration elements chosen by the user. The runtime engine may then execute the subsets of code instructions in the order defined by the modeled flow of the connector integration elements given in the integration process flow diagram. In such a way, an integration process may be executed without the user having to access, read, or write the code instructions of such an integration process.

Such an integration process-modeling user interface may allow a user of the integration application management system to model an integration process between an enterprise system/network 214 and outside entities, and may include several business process data exchanges shown in FIG. 2. For example, the enterprise system/network 214 may be involved in a business process data exchange via network 120 with a trading partner 1, a trading partner 2, a service provider located in the cloud 218, or an enterprise cloud location 216. In some embodiments, a single data integration process may involve movement of data model field values among several different entities, in series. For example, a data model field value may travel via network 120 from the enterprise system 214, to enterprise cloud 216, then cloud service provider 218, and ultimately to trading partner 208. A data model field value may move, undergoing temporary or permanent storage or other manipulations, through potentially hundreds of such different physical servers, at potentially hundreds of geographic locations within a single integration process in some embodiments.

The geographic data integration protection system in an embodiment may receive metadata appended to a data model field value transferred pursuant to the previously executed integration process from an endpoint or destination location at block 804. As a data model field value travels from a source server to a destination server, via potentially hundreds of intermediate servers or locations, metadata appended to the data model field value may record each storage event. For example, metadata appended to a data model field value may be edited at each location at which it is stored (either temporarily at an intermediate location, or permanently at a final destination) to include an identification of the server at which it is being stored. Each server in an embodiment may be identified in metadata according to various formats, such as IP address, URL, port, database name, etc. The metadata appended to the data model field value as it is stored at its final destination pursuant to the data integration process may thus record the identification of every server (including a source, a destination, and all intermediate stops along the way) at which it was stored during the integration process, even if only temporarily. The geographic data integration protection system in an embodiment may request and retrieve this metadata from the final destination storage location of the data model field value following execution of the data process.

This step may be executed in an embodiment following execution of the integration process at the user device, in order to gather accurate information regarding the chain of servers likely to be used to transfer data model field values during later executions. As described herein, the code instructions underlying the integration process may be generated at the service provider server/system 212 in an embodiment. Upon execution of these code sets, data may be transferred to an endpoint or final destination via a plurality of servers, often beginning with a server located geographically nearby the starting point or source of the data. Because the user device 202 may be located remotely from the service provider server/system 212 in an embodiment, data being transferred from the service provider server/system 212 would likely travel through a different series of nearby servers than data being transferred from the user device 202 pursuant to an otherwise almost identical integration process. Thus, in order to accurately identify servers likely to transfer data pursuant to the integration process, a user may perform an initial execution of the integration process.

At block 806, the geographic data integration protection system in an embodiment may use a geolocation service to identify geographical locations of servers through which a data model field value passed during the previously executed integration process. The geographic data integration protection system in an embodiment may analyze the metadata received at block 804 using a geolocation service to identify the geographic location of each identified server through which the data model field value travelled as it moved from the source to the destination. For example, the geographic data integration protection system may use an open-source geolocation service, such as IPStack™ in some embodiments. In other embodiments, the geographic data integration protection system may employ a proprietary geolocation system. Any geolocoation system used herein may access free or paid subscription geolocation databases that identify GPS coordinates, country, state, city, or ZIP/Postal codes for known server IP addresses around the world. In some embodiments, such geolocation databases may also associate such geographic locations with MAC addresses, URLs, ports or databases.

By accessing such geolocation databases in an embodiment, the geographic data integration protection system may identify a geographic location (e.g., GPS coordinates, country, state, city, postal code) for each server through which the data model field value passed during the execution of the integration process at block 802. The geographic data integration protection system in an embodiment may associate each manipulation of the data model field value made throughout the integration process with the identified geographic location at which each manipulation occurred within a fieldname lineage map. In such a way, the geographic data integration protection system in embodiments may provide a lineage of each physical location at which a given data model field value is stored, transmitted, copied, or otherwise manipulated during an integration process.

The geographic data integration protection system in an embodiment may determine whether any servers through which the data model field value passed pursuant to the previously executed integration process are located in user-defined barred locations at block 808. As described herein, a user may indicate one or more geographic locations through which she does not wish data model field values meeting certain search criteria to pass. For example, a user may indicate one or more barred geographic locations through which she does not wish data model field values determined to likely contain sensitive personal information to pass. As another example, a user may provide instructions barring transmission of data model field values identified as potentially containing intellectual property to certain geographic locations.

The geographic data integration protection assistance in an embodiment may identify, via a fieldname lineage map, whether a data model field value falling with a preset data label category has been transmitted through a geographic location a user has defined as barred with respect to that category. For example, in an embodiment described with reference to FIG. 5, the geographic data integration protection system in an embodiment may receive a user instruction to identify servers in Chile as unsafe for storage or receipt of data model field values marked sensitive. In such an embodiment, the geographic data integration protection system may identify at each of the rows displayed in the graphical user interface 500 in FIG. 5 previous passage or storage of sensitive data model field values at a server within Chile.

In some embodiments, the user may even narrow this instruction to identify a given geographic location as unsafe for storage or receipt of data model field values falling within only one of the user-defined data model field value categories. For example, the geographic data integration protection system may receive a user instruction to identify servers in Chile as inappropriate for storage or receipt of data model field values marked "National." In such an embodiment, the geographic data integration protection system may determine at the top row and second to top row of the graphical user interface 500 that data model field values marked "National" have moved through servers within Chile. If the geographic data integration protection system in an embodiment determines a labeled data model field value was transmitted through or to a geographic location identified as barred for that label, the method may proceed to block 810 to notify the user or alter the process flow to inhibit future similar transmissions. If the geographic data integration protection system in an embodiment determines a labeled data model field value was not transmitted through or to a geographic location identified as barred for that label, this may indicate no adjustments to the process flow are needed, and the method may end.

At block 810, in an embodiment in which the data model field value passed through a barred geographic location, the geographic data integration protection system may identify code sets operating to transmit the data model field value to the server in the barred locations and highlight the visual flow element associated with those codesets. For example, the geographic data integration protection system in an embodiment described with reference to FIG. 5 may reference the information upon which the graphical user interface 500 is based to identify a visual shape element within the visual process flow associated with storage of a labeled data model field value at a geographic location that is barred for that label. More specifically, the geographic data integration protection system in an embodiment may identify that a data model field value with a data model fieldname "Social_Security_Number," labeled as "National" was stored, in association with a connector element named "Application A vendor lookup," at a server in Chile, which the user has indicated is barred for storage of data model field values marked "National."

As described herein, a user of an integration process-modeling user interface in an embodiment may model an integration process by adding one or more connector integration elements or code sets to an integration process flow. Each connector element the geographic data integration protection system or the user adds to the integration process flow diagram in an embodiment may be associated with a pre-defined subset of code instructions. Upon determining the connector element named "Application A vendor lookup" is associated with the barred storage of the data model field value "Social_Security_Number" at a server in Chile in an embodiment, the geographic data integration protection system may retrieve the code set associated with the "Application A vendor lookup" connector element.

The geographic data integration protection system may make the identified code set available for export via the graphical user interface in some embodiments. For example, in an embodiment described with reference to FIG. 5, a user may select the row identifying the data model fieldname "Social_Security_Number," then instruct the geographic data integration protection system to export the code set "Application A vendor lookup" by selecting the export button 522. In such a way, the geographic data integration protection system in an embodiment may provide a report of which data model field values containing personal information were accessed, transferred, or otherwise manipulated within banned geographic locations.

In some embodiments, the geographic data integration protection system may also highlight or otherwise draw a user's attention to the visual elements at which such a barred transmission has occurred. For example, in an embodiment described with reference to FIG. 3B in which the data model fieldname "Social_Security_Number" was transmitted to a barred geographical location within Chile pursuant to connector element 312*a*, the geographic data integration protection system may highlight the connector element 312*a* in some manner. More specifically, the geographic data integration protection system in such an embodiment may change the appearance (e.g., color, shape, etc.) of the connector element 312a, or the area immediately surrounding the connector element 312a. In other embodiments the geographic data integration protection system may attach a message or identifying callout to the connector element 312a within the visual flow chart, or may provide animation of some kind (e.g., flashing) to otherwise draw the user's attention to the connector element 312a. In such a way, the geographic data integration protection system in an embodiment may indicate to the user that edits to connector element 312a may be needed to avoid future transmission of data model field values through barred geographic locations.

The geographic data integration protection system in an embodiment may modify the visual flow chart modeling the integration process to inhibit transfer of the data model field value through the barred geographic locations in future executions of the integration process at block 812. In some embodiments, in addition to notifying the user of previous transmissions of data model field values through barred geographic locations, the geographic data integration protection system may modify the flow process automatically to avoid repeating such barred transmissions. For example, in an embodiment described with reference to FIG. 3B, the geographic data integration protection system may insert a second decision element 306b through which all data model field values identified as sensitive may pass. The decision element 306b may be associated with a statement, such as, "the downstream connector element 312a has been identified as being located in a barred geographic location." If such an assigned statement proves true, the decision element 306b may route the integration process including that data model field value toward the exception element 320, which may operate to automatically terminate the transfer of that data model field value. If such an assigned statement proves false, the decision element 306b may route the integration process toward the data process element 308, for encryption and delivery to the destination defined at connector element 312a. In other embodiments, the geographic data integration protection system may insert a new connector element (not shown), rather than the exception element 320. In such an embodiment, the new connector element may identify a different destination than the destination defined at connector element 312a. In such a way, the geographic data integration protection system may automatically update an integration process to avoid transfer of data to barred geographic locations, as defined by the user.

At block 814, the geographic data integration protection system in an embodiment may redeploy the integration process code sets and runtime engine for execution by the user at an enterprise system. For example, in an embodiment described with reference to FIG. 2, a runtime engine located at the enterprise system 214 may be preset to automatically execute at specific times according to a user-defined schedule. In another aspect of such embodiments, a portion of the integration application management system operating at the enterprise system network 214 may check or retrieve updates made to the integration process at the service provider system/server 212 prior to each scheduled execution. In an embodiment in which the geographic data integration protection system has altered the integration process, as described directly above, the integration application management system operating at the enterprise system network 214 may automatically retrieve the updated or edited integration process prior to the next scheduled execution thereof. In such a way, the geographic data integration protection system may inhibit future transmission of labeled data model field values to barred geographic locations for that user-defined dataset label. The method may then end.

The blocks of the flow diagrams 7-8 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a data integration protection assistance system comprising:
    a hardware processor linking, within a data naming lineage map, a first data set field name and a second data set field name identified within code instructions for an execution of a data integration process for accessing and migrating a data set, where the first data set field name is retrieved at a source storage location and renamed to a second data set field name at a destination storage location, where the data naming lineage map associates the data set with a source geographic location and a destination geographic location;
    the hardware processor receiving a user instruction to determine if the first data set field name or the second data set field name are labeled as sensitive private individual data;
    the hardware processor determining that the second data set field name for the destination storage location matches a user-defined, barred geographic location; and
    a graphical user interface displaying a notice that the data set identified with the second data set field name was stored during the executed integration process at the user-defined, barred geographic location.

2. The information handling system of claim 1 further comprising:
    the graphical user interface displaying a name of an individual included within the data set.

3. The information handling system of claim 1 further comprising:
the graphical user interface displaying a description of a process performed on the data set within the code instructions of the data integration process.

4. The information handling system of claim 1 further comprising:
a network interface device automatically transmitting updated machine-executable code instructions for the data integration process at routine intervals for execution by a run-time engine at a remote location according to a preset schedule.

5. The information handling system of claim 4 further comprising:
the hardware processor creating the updated machine-executable code instructions for the data integration process to automatically inhibit transmission of the data set to the user-defined, barred geographic location.

6. The information handling system of claim 4 further comprising:
the hardware processor creating the updated machine-executable code instructions for the data integration process to automatically transmit the data set with the first data set fieldname to a preset, user-specified location, that is not within the user-defined, barred geographic location.

7. The information handling system of claim 1, wherein the data integration protection assistance system inhibits the data integration process from transmitting the data set from the first data set fieldname and labeled as sensitive private individual data to the barred geographic location.

8. A method for protecting data during integration comprising:
linking, via a processor, within a data naming lineage map, a first data set field name and a second data set field name identified within code instructions for execution of a data integration process for accessing a data set field value identified by the first data set field name at a source storage location, and for transferring and renaming the data set field value to a destination storage location, identified by the second data set field name;
determining that the data set field value under the first data set field name or the second data set field name is sensitive private individual data and labeling the first data set field name and the second data set field name as sensitive private individual data;
determining, via the processor, the second data set field name labeled as sensitive private individual data has the destination storage location that matches a user-defined, barred geographic location; and
displaying, via a graphical user interface, a notice to a user that the data set field value is at risk of storage during execution of the integration process within the user-defined, barred geographic location.

9. The method of claim 8 further comprising:
displaying a name of an individual included within the data set field value, via the graphical user interface.

10. The method of claim 8 further comprising:
displaying, via the graphical user interface, a description of a process performed on the data set field value within the code instructions of the data integration process.

11. The method of claim 8 further comprising:
automatically transmitting, via a network interface device, updated machine-executable code instructions for the data integration process to inhibit transmission of the data set field value to the user-defined, barred geographic location.

12. The method of claim 8 further comprising:
automatically transmitting, via a network interface device, updated machine-executable code instructions for the data integration process to automatically transmit the data set field value to a preset, user-specified location, not within the user-defined, barred geographic location.

13. The method of claim 8 further comprising:
generating, via the processor, the notice to the user that the data set field value was stored during execution of the integration process within the user-defined, barred geographic location and identifying a name associated with the sensitive private individual data in the data set field value.

14. The method of claim 11, wherein the data naming lineage map associates the first data set fieldname, the second data set field name, the data integration process, and an action taken upon the data set field value during execution of the data integration process.

* * * * *